United States Patent
Liu

(10) Patent No.: US 10,713,229 B2
(45) Date of Patent: Jul. 14, 2020

(54) INDEX GENERATING DEVICE AND METHOD, AND SEARCH DEVICE AND SEARCH METHOD

(71) Applicant: NEC Corporation, Minato-ku, Tokyo (JP)

(72) Inventor: Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 755 days.

(21) Appl. No.: 14/759,361

(22) PCT Filed: Nov. 15, 2013

(86) PCT No.: PCT/JP2013/080873
§ 371 (c)(1),
(2) Date: Jul. 6, 2015

(87) PCT Pub. No.: WO2014/109127
PCT Pub. Date: Jul. 17, 2014

(65) Prior Publication Data
US 2015/0356129 A1    Dec. 10, 2015

(30) Foreign Application Priority Data

Jan. 11, 2013   (JP) .................................. 2013-003970

(51) Int. Cl.
G06F 16/00 (2019.01)
G06F 16/22 (2019.01)
G06F 16/583 (2019.01)

(52) U.S. Cl.
CPC ...... *G06F 16/2246* (2019.01); *G06F 16/2264* (2019.01); *G06F 16/5838* (2019.01)

(58) Field of Classification Search
CPC ......... G06F 17/30327; G06F 17/30256; G06F 16/22
See application file for complete search history.

(56) References Cited

U.S. PATENT DOCUMENTS 6,671,694 B2 * 12/2003 Baskins .............. G06F 16/9027
7,216,129 B2 *  5/2007 Aono .................. G06F 16/3344
(Continued)

FOREIGN PATENT DOCUMENTS

EP       1207464 A2    2/2001
JP    2000-035965 A    2/2000
(Continued)

OTHER PUBLICATIONS

Japanese Office Action for JP Application No. 2014-556333 dated Jun. 27, 2017 with English Translation.
(Continued)

*Primary Examiner* — Usmaan Saeed
*Assistant Examiner* — David M Nafziger

(57) ABSTRACT

An index generating device (100) comprises: an index generating unit (101) which uses an interdata similarity degree which is computed by a similarity computation unit (105) to generate an index which includes a lower order node, and a higher order node which includes an entry having a link relation with the lower order node and indicating representative data having a similarity degree with data indicated by an entry in the lower order node greater than or equal to a similarity threshold value appended to the link relation; and a threshold setting unit (102) which sets the similarity threshold to a value which increases the further down the hierarchy.

14 Claims, 21 Drawing Sheets

(56) References Cited

U.S. PATENT DOCUMENTS

| | | | |
|---|---|---|---|
| 8,112,374 B2* | 2/2012 | Van Dyke Parunak | G06F 16/35 706/45 |
| 8,352,465 B1 | 1/2013 | Jing et al. | |
| 8,356,035 B1* | 1/2013 | Baluja | G06F 16/583 707/741 |
| 9,251,156 B2* | 2/2016 | Tamano | G06F 16/182 |
| 2003/0018652 A1* | 1/2003 | Heckerman | G06Q 30/0641 |
| 2004/0249789 A1* | 12/2004 | Kapoor | G06F 16/215 |
| 2006/0004747 A1* | 1/2006 | Weare | G06F 16/367 |
| 2006/0080311 A1* | 4/2006 | Potok | G06F 16/355 |
| 2006/0242190 A1* | 10/2006 | Wnek | G06F 16/367 |
| 2007/0027884 A1* | 2/2007 | Heger | G06F 16/9027 |
| 2007/0179944 A1* | 8/2007 | Van Dyke Parunak | G06F 16/35 |
| 2007/0203924 A1* | 8/2007 | Guha | G06F 16/34 |
| 2008/0140707 A1* | 6/2008 | Lang | G06F 16/2237 |
| 2010/0042597 A1* | 2/2010 | Shinjo | G06F 16/90344 707/769 |
| 2010/0088320 A1* | 4/2010 | Fortier | G06Q 50/24 707/746 |
| 2011/0016128 A1* | 1/2011 | Forman | G06F 16/951 707/737 |
| 2011/0238638 A1 | 9/2011 | Thompson | |
| 2011/0246479 A1* | 10/2011 | Chen | G06F 16/2228 707/743 |
| 2012/0078927 A1* | 3/2012 | Gollapudi | G06F 16/954 707/755 |
| 2012/0215806 A1* | 8/2012 | Pryakhin | G06F 16/2246 707/769 |
| 2012/0284572 A1 | 11/2012 | Shirakawa et al. | |
| 2013/0117253 A1* | 5/2013 | Wang | G06F 16/972 707/709 |
| 2013/0138696 A1* | 5/2013 | Turdakov | G06F 16/367 707/794 |
| 2013/0290384 A1* | 10/2013 | Anderson | G06F 16/13 707/822 |
| 2013/0318126 A1* | 11/2013 | Graefe | G06F 16/2246 707/797 |
| 2013/0325798 A1* | 12/2013 | Yuan | G06Q 10/107 707/609 |
| 2014/0114982 A1* | 4/2014 | Lamba | G06F 16/36 707/748 |
| 2014/0149574 A1* | 5/2014 | Findeisen | H04L 43/065 709/224 |
| 2014/0188830 A1* | 7/2014 | deVille | G06F 16/355 707/706 |
| 2014/0222873 A1* | 8/2014 | Nakadai | G06F 16/2282 707/803 |

FOREIGN PATENT DOCUMENTS

| | | |
|---|---|---|
| JP | 2000-112973 A | 4/2000 |
| JP | 2001-160057 A | 6/2001 |
| JP | 2002-163272 A | 6/2002 |
| JP | 2004-046612 A | 2/2004 |
| JP | 4545641 B2 | 12/2006 |
| JP | 2008-217246 A | 9/2008 |
| JP | 2008-224343 A | 9/2008 |
| JP | 2009-020769 A | 1/2009 |
| JP | 4906900 B2 | 4/2011 |
| JP | 2011-090352 A | 5/2011 |
| JP | 2011-257970 A | 12/2011 |
| JP | 2012-079186 A | 4/2012 |
| JP | 2012-234446 A | 11/2012 |

OTHER PUBLICATIONS

Aronovich Lior et al., "CM-tree: A dynamic clustered index for similarity search in metric databases", Data & Knowledge Engineering, Elsevier, vol. 63, No. 3, Dec. 1, 2007, pp. 919-946, Information Systems Department, Tel Aviv University, Israel.

Extended European Search Report for EP Application No. EP13870453.1 dated Jun. 7, 2016.

International Search Report for PCT Application No. PCT/JP2013/080873, dated Dec. 10, 2013.

English translation of Written opinion for PCT Application No. PCT/JP2013/080873.

"R-Trees: A Dynamic Index Structure for Spatial Searching" by Antonin Guttman, published by SIGMOD Conference, 1984, pp. 47-57.

Wei Dong, Moses Charikar, Kai Li, "Efficient k-nearest neighbor graph configuration for generic similarity measures", WWW 2011, 577-586.

Stanley Milgram, "The Small World Problem", Psychology Today, May 1967, pp. 60-67.

J. Travers and S. Milgram, "An experimental study of the small world problem", Sociometry 32, 425, 1969.

* cited by examiner $sim(f_2, f_6) = 0.85$

INDEX GENERATING DEVICE AND METHOD, AND SEARCH DEVICE AND SEARCH METHOD

This application is a National Stage Entry of PCT/JP2013/080873 filed on Nov. 15, 2013, which claims priority from Japanese Patent Application 2013-003970 filed on Jan. 11, 2013, the contents of all of which are incorporated herein by reference, in their entirety.

TECHNICAL FIELD

The present invention relates to a data similarity search technology.

BACKGROUND ART

As illustrated in PTL 1 to 10 mentioned below, various similarity search techniques have now been proposed. It is often the case that such a similarity search is performed for multidimensional data or high-dimensional data as search objects, such as feature amount data about images. For example, PTL 1, 3 and 6 propose similar image search methods. PTL 2 proposes a technique that searches for similar data by using a database in which a link for tracing from one datum to another datum is set among data. PTL 5 proposes a technique that hierarchically classifies an arbitrary set of images. PTL 7 proposes a technique that searches a set of high-dimensional feature vectors for a feature vector similar to a query feature vector. PTL 9 proposes a technique that classifies various learning patterns into buckets that correspond to hash values by using a hash function, and retrieves from the learning patterns that belong to a packet corresponding to a hash value of an input pattern a learning pattern that is the most similar to the input pattern. PTL 10 proposes a data matching method that extracts desired data from multidimensional data that can express a plurality of feature amounts by vectors by specifying conditions. Note that, hereinafter, "high dimensional" and "multidimensional" will be used without any particular discrimination.

In the similarity search as described above, similarity degree between object data is calculated by using a similarity degree function or the like. For example, a feature amount datum about an image is expressed by a multidimensional numerical vector, and a similarity degree between feature amount data that are comparison objects is calculated by the similarity degree function. PTL 4 proposes a technique that, regarding all the feature amounts within a database, calculates similarity degrees of each feature amount with the other feature amounts, and stores an f(x) number of highest-level ID information pieces in descending order of similarity degree together with the place in order of similarity degree, and then performs search regarding the stored contents to search for similar feature amounts.

Moreover, an index regarding object data is constructed, and a similarity search is performed by using this index, so that search is made quicker. As an index generation technique for multidimensional data, R-tree is known (refer to NPL 1). Furthermore, PTL 8 proposes a technique that divides a feature vector space into a plurality of approximation regions and that generates an indexing tree in which the approximation regions are hierarchized according to the density and scarcity of the approximation regions. Note that NPL 2, 3 and 4 as mentioned below will be discussed later.

CITATION LIST

Patent Literature

PTL 1: Publication of Japanese Patent No. 4545641
PTL 2: Japanese Laid-open Patent Publication No. 2011-090352
PTL 3: Japanese Laid-open Patent Publication No. 2012-079186
PTL 4: Japanese Laid-open Patent Publication No. 2000-035965
PTL 5: Japanese Laid-open Patent Publication No. 2001-160057
PTL 6: Publication of Japanese Patent No. 4906900
PTL 7: Japanese Laid-open Patent Publication No. 2011-257970
PTL 8: Japanese Laid-open Patent Publication No. 2002-163272
PTL 9: Japanese Laid-open Patent Publication No. 2009-020769
PTL 10: Japanese Laid-open Patent Publication No. 2004-046612

Non Patent Literature

NPL 1: "R-Trees: A Dynamic Index Structure for Spatial Searching" by Antonin Guttman, published by SIGMOD Conference, 1984, pp. 47-57
NPL 2: Wei Dong, Moses Charikar, Kai Li, "Efficient k-nearest neighbor graph configuration for generic similarity measures", WWW 2011, 577-586
NPL 3: Stanley Milgram, "The Small World Problem", Psychology Today, May 1967, pp. 60-67
NPL 4: J. Travers and S. Milgram, "An experimental study of the small world problem", Sociometry 32, 425, 1969

SUMMARY OF INVENTION

Technical Problem

However, since similarity search techniques as described above strongly depend on data structure of object data, the similarity search techniques are not able to cope with the case where number of dimensions of an object datum exceeds a predetermined number, the case where data internal structure of an object datum, such as number of dimensions or data type in each dimension, is unknown, or the like. For example, the technique that uses a space index, such as an R-tree, performs similarity search processing by using a geometric property, such as a triangle inequality in a metric space, so that when the number of dimensions or the data internal structure in each dimension is unknown, the technique is not able to construct a spatial index and therefore not able to perform similarity search processing. Note that the data structure of object data means the data format of the entire object data, number of dimensions of the object data, internal structure of the data in each dimension, or the like.

The present invention has been made in view of the foregoing circumstances, and is to provide a general-purpose similarity search technology that does not depend on data structure of object data.

Solution to Problem

Various aspects of the present invention individually adopt constitution as follows, in order to solve the problems stated above.

A first aspect relates to an index generating device that generates an index in which a plurality of nodes each of which includes at least one entry that indicates a datum that becomes an index object are hierarchized. The index generating device according to the first aspect includes an index generating unit that, using a similarity degree between data computed by a similarity computation unit, generates the index that includes a lower order node and a higher order node which includes an entry that has a link relation with the lower order node and that indicates a representative datum having a similarity degree with a datum indicated by an entry in the lower order node greater than or equal to a similarity degree threshold value appended to the link relation, and a threshold setting unit that sets the similarity degree threshold value to a value that increases with descent in hierarchy.

A second aspect relates to an index generating method that generates an index in which a plurality of nodes each of which includes at least one entry that indicates a datum that becomes an index object are hierarchized. The index generating method according to the second aspect includes generating the index that includes a lower order node and a higher order node which includes an entry that has a link relation with the lower order node and that indicates a representative datum having a similarity degree with a datum indicated by an entry in the lower order node greater than or equal to a similarity degree threshold value appended to the link relation, and setting the similarity degree threshold value to a value that increases with descent in hierarchy.

A third aspect relates to a search device that uses an index generated by the foregoing first aspect or second aspect. The search device according to the third aspect includes a condition acquisition unit that acquires a search object datum and a similarity degree condition, a similarity degree acquisition unit that acquires at least one similarity degree between at least one representative datum indicated by an entry in the higher order node and the search object datum, and a search processing unit that compares the at least one similarity degree acquired by the similarity degree acquisition unit with a similarity degree threshold value appended to the link relation of an entry that indicates the at least one representative datum or the similarity degree condition, and, based on a result of comparison, excludes the entry indicating the at least one representative datum which is included in the higher order node and entries of the lower order node that has the link relation with the entry and of one or more lower order nodes subsequent to the lower order node from extraction objects that conform to the similarity degree condition with regard to the search object data.

A fourth aspect relates to a search method that uses the index generated by the foregoing first aspect or second aspect. The search method according to the fourth aspect includes acquiring a search object datum and a similarity degree condition, acquiring at least one similarity degree between at least one representative datum indicated by an entry in the higher order node and the search object datum, comparing the at least one similarity degree acquired and a similarity degree threshold value appended to the link relation of an entry that indicates the at least one representative datum or the similarity degree condition, and excluding, based on a result of comparison, the entry indicating the at least one representative datum which is included in the higher order node and entries of the lower order node that has the link relation with the entry and of one or more lower order nodes subsequent to the lower order node from extraction objects that conform to the similarity degree condition with regard to the search object data.

A fifth aspect relates to a data structure of an index in which a plurality of nodes each of which includes at least one entry that indicates a datum that becomes an index object are hierarchized. In the data structure of the index according to the fifth aspect, the index includes a lower order node, and a higher order node that includes an entry that has a link relation with the lower order node and that indicates a representative datum having a similarity degree with a datum indicated by an entry in the lower order node greater than or equal to a similarity degree threshold value appended to the link relation, and the similarity degree threshold value is set to a value that increases with descent in hierarchy, and a computer refers to the index in order to compute a similarity degree between the representative data indicated by the entry in the higher order node and a search object datum, compare the similarity degree and the similarity degree threshold value appended to the link relation that the entry in the higher order node has, and, based on a result of comparison, obtain a search result that corresponds to the search object datum.

As another aspect of the present invention, there may be provided a program that causes at least one computer to execute the method of the foregoing second aspect or fourth aspect or a computer-readable recording medium in which such a program has been recorded. Moreover, there may also be provided a computer-readable recording medium in which an index having the data structure of the fifth aspect has been recorded. This recording medium includes a non-transitory tangible medium.

Advantageous Effects of Invention

According to the foregoing aspects, a general-purpose similarity search technology that does not depend on the data structure of object data can be provided.

BRIEF DESCRIPTION OF DRAWINGS

The foregoing object and other objects, features and advantages will be made more apparent by preferred exemplary embodiments described below and accompanying drawings mentioned below.

DESCRIPTION OF EMBODIMENTS

Hereinafter, exemplary embodiments of the present invention will be described. Note that the exemplary embodiments presented below are illustrative, and the present invention is not limited to the constitution of the exemplary embodiments below.

Figure 1:
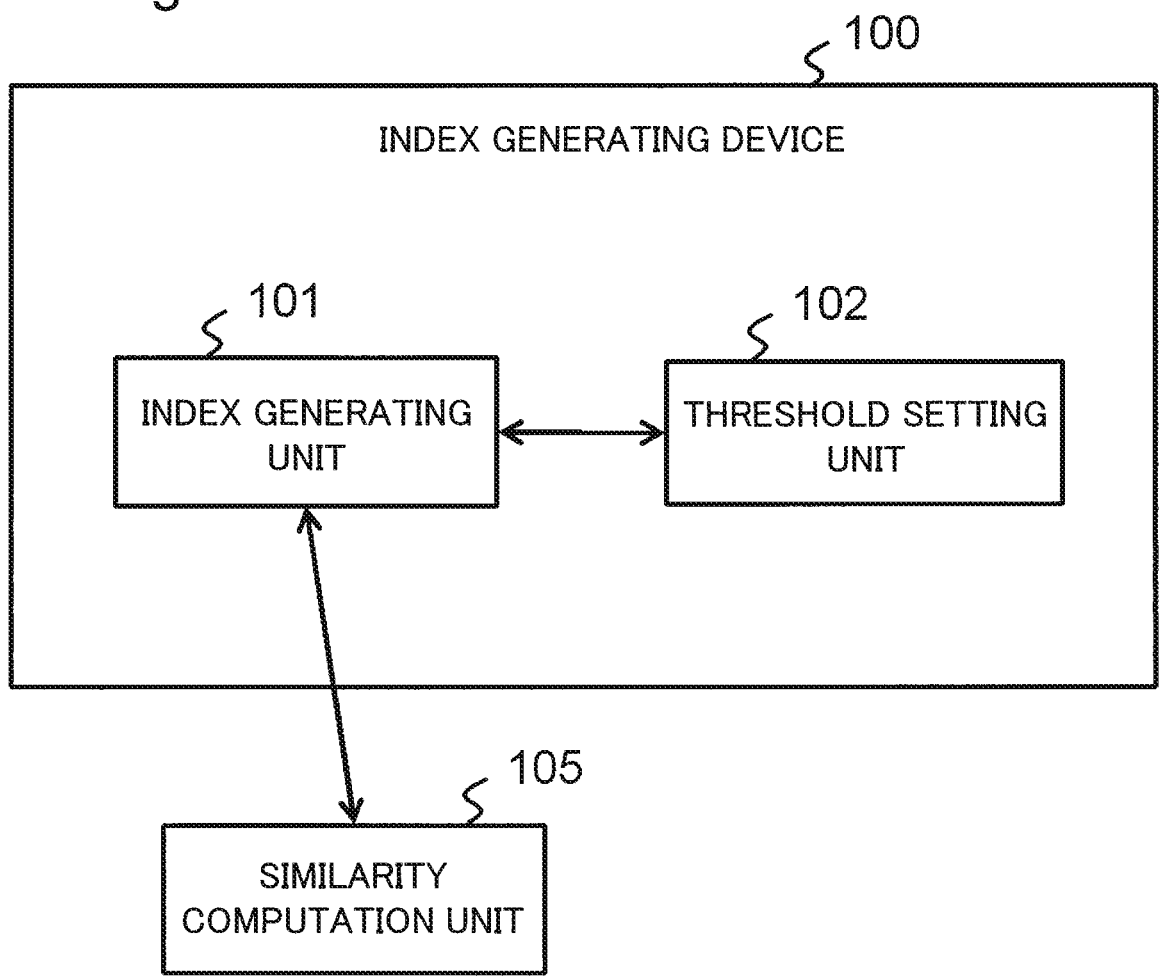
FIG. 1 is a diagram conceptually illustrating a configuration example of an index generating device according to an exemplary embodiment of the present invention.

FIG. 1 is a diagram conceptually illustrating a configuration example of an index generating device 100 according to an exemplary embodiment of the present invention. The index generating device 100 generates an index in which a plurality of nodes each of which includes at least one entry that indicates a datum that becomes an index object is hierarchized. "Node" means a data element that constitutes a data structure of the index to be generated, and is realized by, for example, an arrangement, a structural body, a class, or the like. In addition, "data that becomes an index object" means data to which an index is appended. In this exemplary embodiment, the data structure of a datum that becomes an index object is not restricted. That is, a number of dimensions of such the datum is not restricted, and the data structure of the datum may be unknown. Furthermore, in this exemplary embodiment, a form of association of data and an entry included in a node is not restricted. An entry may include a datum, and the entry may include a pointer that points to a storage area of the datum.

As illustrated in FIG. 1, an index generating device 100 includes an index generating unit 101 which, using a similarity degree between data which is computed by a similarity computation unit 105, generates an index that includes a lower order node and a higher order node which includes an entry that has a link relation with the lower order node and that indicates a representative datum having a similarity degree with data indicated by an entry in the lower order node greater than or equal to a similarity degree threshold value appended to the link relation, and a threshold setting unit 102 that sets the similarity degree threshold to a value that increases with descent in the hierarchy. The similarity degree in this exemplary embodiment means the degree of approximation. The greater the value of the similarity degree, the greater the degree of approximation becomes. Conversely, the smaller the value of the similarity degree, the lower the degree of approximation becomes.

In addition, in this exemplary embodiment, a manner the entry included in a higher order node has a link relation with a lower order node is not restricted. For example, the entry may have a pointer that points to a lower order node. Moreover, the entry may have a discriminant ID of a lower order node, and a correspondence relation between the discriminant ID of this lower order node and a pointer that points to the lower order node may be held. Furthermore, the entry may have a discriminant ID of a link, and a correspondence relation between the discriminant ID of this link and a pointer that points to a lower order node may be held.

The index generating device 100 has, for example, a hardware configuration substantially the same as a high-dimensional data search device 1 in a detailed exemplary embodiment described later. The foregoing processing units are realized as a program is processed in substantially the same manner as in the high-dimensional data search device 1. The similarity computation unit 105 may be realized by the index generating device 100, or may also be realized by another computer.

In addition, an index generating method according to an exemplary embodiment of the present invention generates an index in which a plurality of nodes each of which includes at least one entry that indicates a datum that becomes an index object is hierarchized. This index generating method is executed by a computer, such as the index generating device 100, and includes generating an index that includes a lower order node and a higher order node that includes an entry that has a link relation with the lower order node and that indicates a representative datum having a similarity degree with a datum indicated by an entry in the lower order node greater than or equal to a similarity degree threshold value appended to the link relation, and setting the similarity degree threshold to a value that increases when hierarchy descends. The steps included in this index generating method may be executed sequentially in arbitrary order or may be performed simultaneously.

Figure 2:
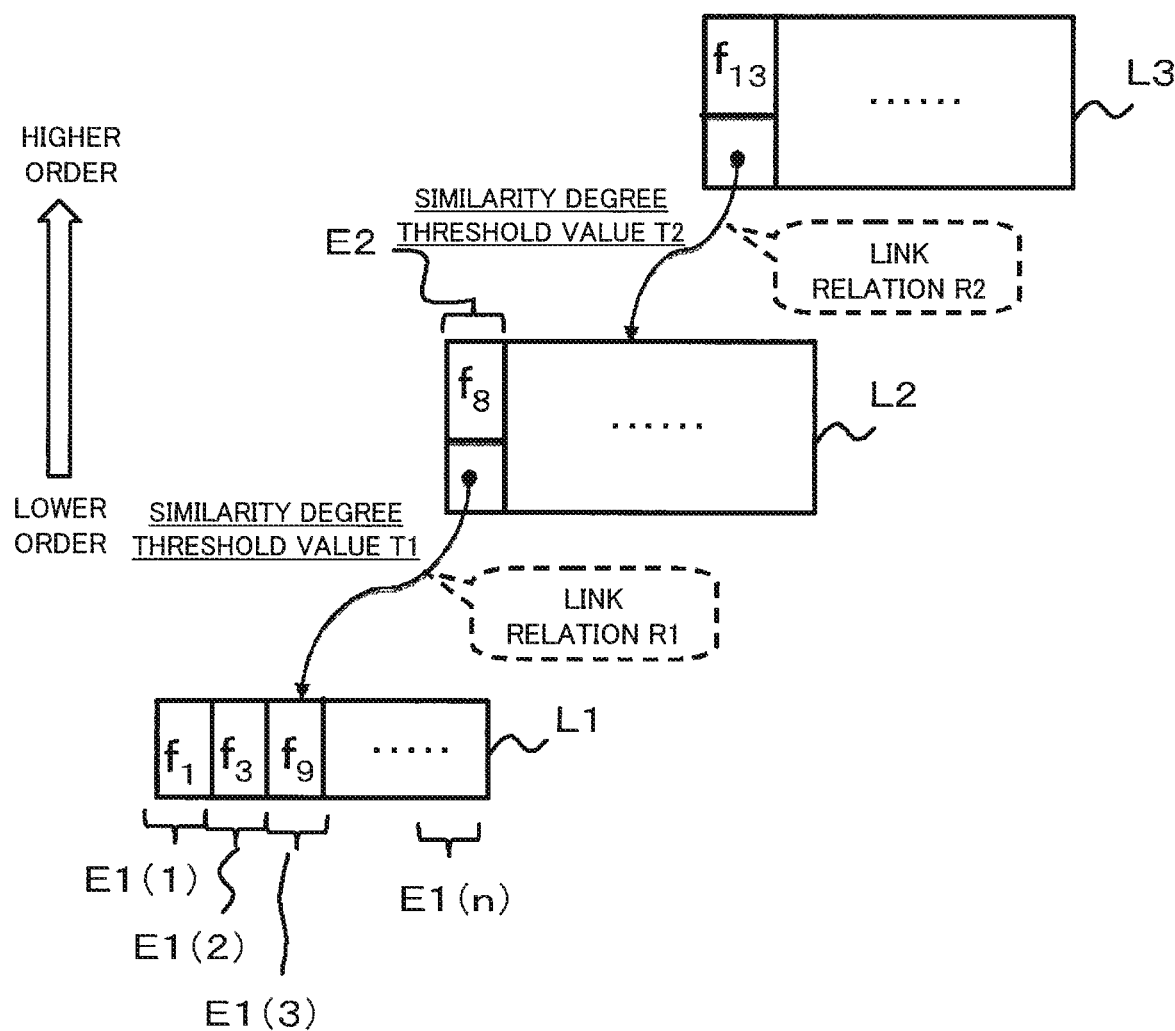
FIG. 2 is a diagram conceptually illustrating an example of a portion of an index generated in the exemplary embodiment.

FIG. 2 is a diagram conceptually illustrating an example of a portion of an index generated in this exemplary embodiment. As illustrated in FIG. 2, in this exemplary embodiment, an index, that includes a lower order node L1 and a higher order node L2 that includes an entry E2 that has a link relation R1 with the lower order node L1 and that indicates a representative datum f8 having a similarity degree with a datum (f1, f3, f9, or the like) indicated by entries E1(1), E1(2), E1(3) and E1(n) of the lower order node L1 greater than or equal to a similarity degree threshold value T1 appended to the link relation R1, is generated. Moreover, the similarity degree threshold value T1 is set to a value that increases with descent in the hierarchy. Therefore, according to the example in FIG. 2, the similarity degree threshold value T1 is set to a value that is greater than the similarity degree threshold value T2 appended to the link relation of a higher order. Note that the entry that indicates the representative datum f8 is included only in the higher order node L2 in the example in FIG. 2, entries indicating the representative datum f8 may be included in both the higher order node L2 and the lower order node L1.

Hereinafter, operation and advantageous effects of this exemplary embodiment as well as the technical idea embodied by this exemplary embodiment will be described.

The present inventors, focusing on a law that when a datum A and a datum B are similar and the datum B and a datum C are similar, the datum A and the datum C are similar (NPL 2), have acquired an idea of adopting this law for the data structure of an index for a similarity search. This law is not necessarily true, but is highly likely to be true. As a real-world example of this respect, a so-called small world theory is known (refer to the aforementioned NPL 3 and 4). Namely, this theory indicates that when a person A and a person B are friends and the person B and a person C are friends, the person A and the person C are highly likely to be friends.

Three data that become index objects are indicated by fa, fb and fc, and a set of data fi that become index objects is indicated by F, and a search object datum is indicated by fq. It is assumed that the datum fb belongs to the set F, and that the datum fb is a representative of all the data included in the set F. In this case, the foregoing law can be expressed by the following expression. In the following formulae, sim( ) is a function that calculates the similarity degree between two data, and also is capable of calculating the similarity degree between a datum and a set of data. For example, sim( ) corresponds to the similarity computation unit 105. Furthermore, δ indicates a threshold value of the similarity degree.

[Math. 1]

$$\mathrm{sim}(f_a,f_b) \geq \delta \wedge \mathrm{sim}(f_b,f_c) \geq \delta \Rightarrow \mathrm{sim}(f_a,f_c) \geq \delta \quad (1)$$

$$\mathrm{sim}(f_q,f_b) \geq \delta \wedge \mathrm{sim}(f_b,f_c) \geq \delta \Rightarrow \mathrm{sim}(f_q,f_c) \geq \delta \quad (2)$$

$$\mathrm{sim}(f_q,f_b) \geq \delta \wedge \mathrm{sim}(f_b,F) \geq \delta \Rightarrow \mathrm{sim}(f_q,F) \geq \delta \quad (3)$$

The aforementioned formula (1) expresses the foregoing law. That is, the aforementioned formula (1) indicates that when the similarity degree between the datum fa and the datum fb is greater than or equal to a threshold value δ and the similarity degree between the datum fb and the datum fc is greater than or equal to the threshold value δ, the similarity degree between the datum fa and the datum fc is greater than or equal to the threshold value δ. If the datum fa in the aforementioned formula (1) is substituted with the search object data fq, the aforementioned formula (2) is satisfied. In other words, when the similarity degree between the datum fq and the datum fb is greater than or equal to the threshold value δ and the similarity degree between the datum fb and the datum fc is greater than or equal to the threshold value δ, it can be determined that the similarity degree between the datum fq and the datum fc is greater than or equal to the threshold value δ.

Furthermore, if the datum fc in the formula (2) is substituted with the data set F, the aforementioned formula (3) is satisfied. That is, when the similarity degree between the datum fq and the datum fb is greater than or equal to the threshold value δ and the similarity degree between the datum fb and the data set F is greater than or equal to the threshold value δ, it can be determined that the similarity degree between the datum fq and the data set F is greater than or equal to the threshold value δ.

As stated above, the datum fb is a representative of all the data included in the set F. Therefore, according to the formula (3), when the similarity degrees between the datum fb and the various data fi included in the data set F have been each calculated, the similarity degrees between the search object datum fq and the various data fi in the data set F can be determined without performing calculation, by computing only the similarity degree between the search object datum fq and the representative datum fb. The present inventors have adopted the law as mentioned above for the data structure of an index in this exemplary embodiment.

According to FIG. 2, the lower order node L1 corresponds to the data set F, and the representative datum f8 corresponds to the datum fb that is a representative of the set F. An entry that indicates a datum having a similarity degree with the representative datum f8 greater than or equal to the similarity degree threshold value T1 is set to the lower order node L1. Due to this, according to this exemplary embodiment, by computing only the similarity degree between the representative datum f8 and the search object datum fq, the similarity degree between the search object datum fq and the set of data indicated in the lower order node L1 can be determined without performing calculation. For example, when the similarity degree between the representative datum f8 and the search object datum fq is less than the similarity degree threshold value T1, it can be determined that the similarity degree between the search object datum fq and all the data indicated in the lower order node L1 is less than the similarity degree threshold value T1 without performing calculation of the similarity degree.

Therefore, by using the index generated by this exemplary embodiment, computational complexity of the search (the number of times of calculating the similarity degree) can be reduced.

Furthermore, according to the example in FIG. 2, the similarity degree threshold value T1 is set to a value that is greater than the similarity degree threshold value T2 appended to the link relation of a higher order. Due to this, the similarity degrees between the data indicated by entries included in the higher order node L2 and the representative datum f13 included in an even higher order node L3 are greater than or equal to the similarity degree threshold value T2 and less than the similarity degree threshold value T1. As a result, in the index generated in this exemplary embodiment, a set of data having similarity degrees that increase with descent in the hierarchy is indicated.

In this manner, in this exemplary embodiment, an index of a tree structure hierarchized based on the similarity degree between data without depending on the data structure of object data is generated. Moreover, the index generation in this exemplary embodiment does not depend on the number of dimensions of the object data, either. This is because this exemplary embodiment generates an index based on the similarity degree between data without depending on a geometric property that corresponds to the dimension of data.

Therefore, by using the index generated by this exemplary embodiment, a similarity search can be performed even in the case where the data structure of object data is unknown, the case where the object data are high-dimensional data, or the like. In other words, according to this exemplary embodiment, a general similarity search technology that does not depend on the data structure of object data can be provided.

Moreover, according to the exemplary embodiment, since the foregoing law that uses a relation in similarity degree is adopted for the data structure of the index, the computational complexity of similarity degree can be reduced as stated above, and thus the decrease in search efficiency due to an increase in the number of dimensions of object data can be prevented. In this respect, according to the proposed techniques described above in Background Art, as the number of dimensions of data increases, great amounts of overlaps between nodes in the space index occur, so that all the data are scanned at the time of search and therefore the search efficiency sharply declines.

Furthermore, according to this exemplary embodiment, since an index is generated based on the similarity degree between data, the similarity degree computation technique of the similarity computation unit 105 described above may be a black box. Hence, according to this exemplary embodiment, general and efficient similarity search technology that does not depend on either the data structure of object data or the similarity degree computation technique can be provided.

Hereinafter, the foregoing exemplary embodiment will be described further in detail. As detailed exemplary embodiments, Exemplary Embodiment 1 and Exemplary Embodiment 2 will be illustrated as examples below. The exemplary embodiments below are examples of the case where the index generating device and the index generating method described above are applied to a high-dimensional data search device. Note that the index generating device and the index generating method described above are not limited to applications to search devices that handle high-dimensional data, but are applicable to search devices for various data where a similarity degree can be computed.

Exemplary Embodiment 1

(Structure of Device)

Figure 3:
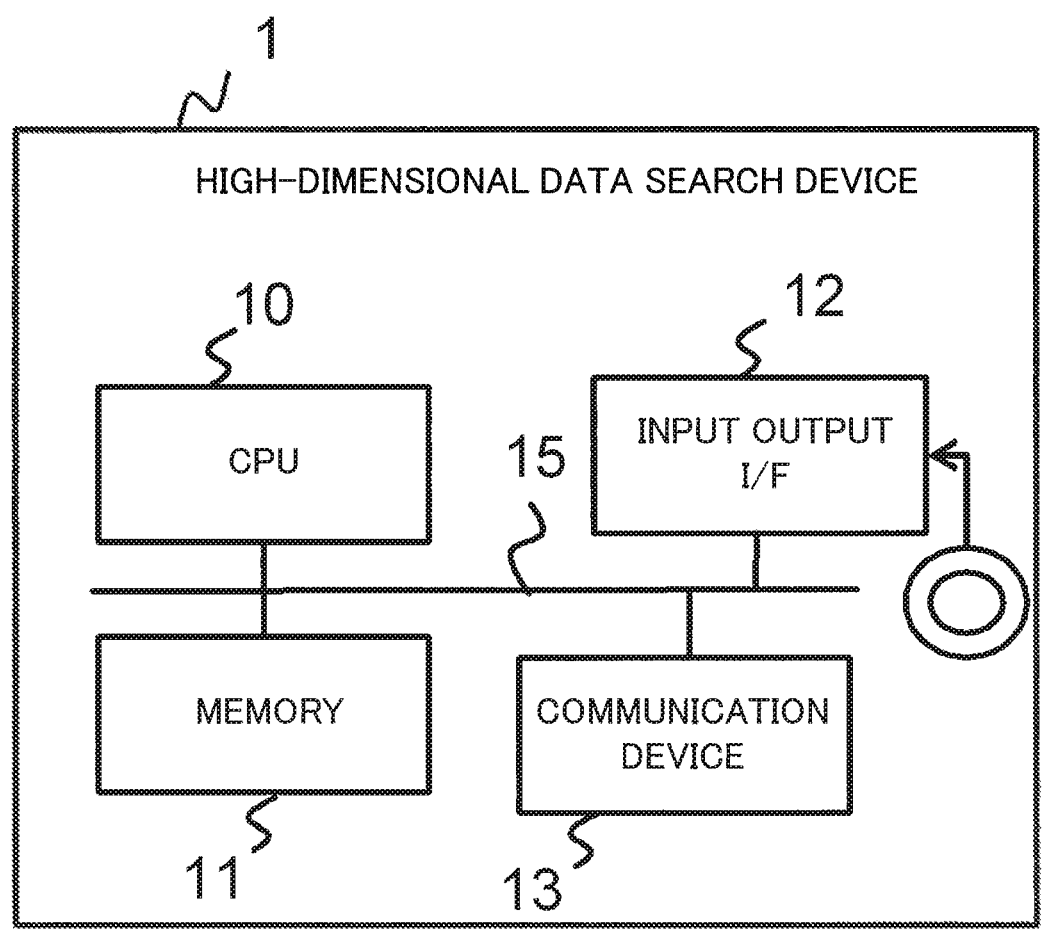
FIG. 3 is a diagram conceptually illustrating a hardware configuration example of a high-dimensional data search device in a first exemplary embodiment.

FIG. 3 is a diagram conceptually illustrating a hardware configuration example of a high-dimensional data search device (hereinafter, simply termed search device) 1 in Exemplary Embodiment 1. The search device 1 in Exemplary Embodiment 1, as illustrated in FIG. 3, includes as a hardware configuration a CPU (Central Processing Unit) 10, a memory 11, an input-output interface (I/F) 12, a communication device 13 and the like, that are interconnected by a bus 15. The memory 11 is a RAM (Random Access Memory), a ROM (Read-Only Memory), a hard disk, a portable type storage (recording) medium or the like. The input-output I/F 12 is connectable to input devices (not illustrated in the drawings) that accept inputs based on a user's operation, such as a keyboard, a mouse and the like, output devices (not illustrated in the drawings) that provide information for a user, such as a display device, a printer, and the like. The communication device 13 communicates with other nodes. Note that the search device 1 may lack an input device or an output device. The hardware configuration of the search device 1 is not restricted.

The search device 1 acquires index object data and generates an index that has a data structure illustrated in the exemplary embodiment described above, based on the acquired index object data. In addition, the search device 1 acquires search object data and similarity degree condition and searches for a datum that conforms to the similarity degree condition among the search object data by using the index generated as described above. In this exemplary embodiment, the index generated by the search device 1 is sometimes described as the similarity degree tree. The similarity degree tree means an index that has a hierarchical structure based on the similarity degree. A portion of the search device 1 corresponds to the foregoing index generating device 100.

(Processing Configuration)

Figure 4:
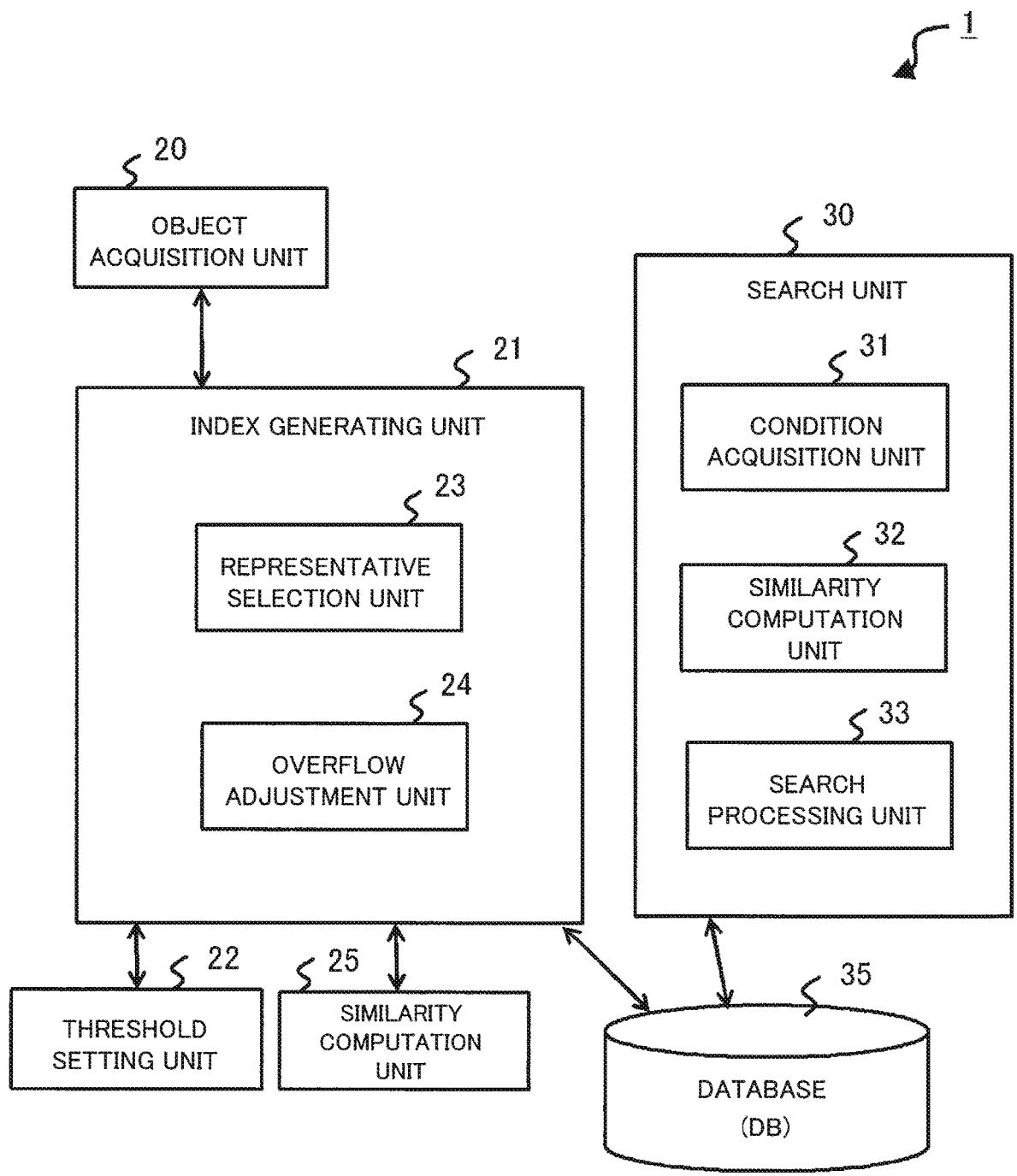
FIG. 4 is a diagram conceptually illustrating a processing configuration example of the high-dimensional data search device in the first exemplary embodiment.

FIG. 4 is a diagram conceptually illustrating a processing configuration example of the search device 1 in Exemplary Embodiment 1. The search device 1 in Exemplary Embodiment 1 includes an object acquisition unit 20, an index generating unit 21, a threshold setting unit 22, a search unit 30, a database 35, and the like. These processing units are realized by, for example, the CPU 10 executing programs stored in the memory 11. In addition, these programs may be installed from a portable type recording medium such as a CD (Compact Disc) or a memory card, or another computer on a network via the input-output I/F 12, and stored in the memory 11.

The object acquisition unit 20 acquires high-dimensional feature amount data, such as video images, as index object data. The feature amount data may be information input by a user operating an input device based on an input screen or the like, or may also be information acquired from a portable type recording medium, another computer or the like through the input-output I/F 12 or the communication device 13.

The index generating unit 21, similarly to the index generating unit 101 in the index generating device 100 described above, generates and updates the similarity degree tree that becomes an index of the feature amount data acquired by the object acquisition unit 20. The data of the similarity degree tree generated or updated are stored in the database 35. Note that the data of the similarity degree tree may be stored in a portable type recording medium via the input-output I/F 12 or may be sent to another computer via the communication device 13.

This exemplary embodiment adopts a form in which each node constituting the similarity degree tree has a data structure as follows. An entry in a higher order node which has a link relation with a lower order node includes a pointer that points to the lower order node, a similarity degree threshold value appended to the link relation, and a feature amount datum indicated by the entry. An entry in the higher order node that does not have a link relation with a lower order node includes a feature amount datum indicated by the entry. In addition, each of the entries included in a node that does not have any entry that includes a pointer to a lower order node includes a pointer that points to a storage area within the database 35 for the feature amount datum indicated by the entry. Moreover, the feature amount data included in an entry in which a pointer to a lower order node is set is also set in an entry that is included in the lower order node, or a pointer to the feature amount data is set in an entry that is included in the lower order node.

Hereinafter, there will be cases where the node that does not have any entry that includes a pointer to a lower order node is called leaf node and where a node that has at least one entry that includes a pointer to a lower order node is called intermediate node. Additionally, there will also be cases where the highest order node among the intermediate nodes is called root node. Hence, according to FIG. 2, a node L3 can be called root node or intermediate node, a node L2 can be termed intermediate node, and a node L1 can be termed leaf node.

Moreover, there will also be cases where the relation between a higher order node and the lower order node that is linked thereto by a pointer of an entry included in the higher order node is called parent-child relation, and there will also be cases where the higher order node and the lower order node that have that parent-child relation are called parent node and lower order node, respectively. Hence, according to FIG. 2, in the relation between the node L2 and the node L1, the node L2 can be termed parent node, and the node L1 can be termed child node.

The index generating unit 21, when reflecting the feature amount datum of an object acquired by the object acquisition unit 20 in a similarity degree tree, acquires from a similarity computation unit 25 the similarity degree between the feature amount datum of the object and the feature amount datum indicated by an entry in an intermediate node which includes a pointer to a lower order node, compares the similarity degree and the similarity degree threshold value included in that entry, and, based on a result of the comparison, sets an insertion destination of the entry that includes the feature amount datum of the object to that intermediate node or that lower order node. Specifically, the index generating unit 21 sets the insertion destination of the entry that includes the feature amount data of the object to the lower order node if the similarity degree is greater than or equal to the similarity degree threshold value, and sets the insertion destination of the entry that includes the feature amount data of the object to the intermediate node if the similarity degree is less than the similarity degree threshold value.

Furthermore, the index generating unit 21 includes a representative selection unit 23 and an overflow adjustment unit 24.

The representative selection unit 23 selects a representative entry from a plurality of entries included in a certain node according to need at the time of addition or deletion of feature amount data. This corresponds to selecting a representative datum fb from the data set F. Hence, the representative entry means an entry indicating the feature amount datum that has been selected as a representative. Moreover, the feature amount datum included in the representative entry is also called representative feature amount datum. The population of entries from which a representative entry is selected may be all the entries included in an object node, or may also be only entries that do not include a pointer to a lower order node among all the entries included in the object node. In the cases where a population is all the entries included in an object node, there are cases where reconfiguration of a child node that already exists becomes necessary.

For example, the representative selection unit 23 selects a representative entry by using either one of two selection methods indicated below. However, this exemplary embodiment does not restrict the representative entry selection method to the methods as follows. The representative selection unit 23 may randomly select an arbitrary entry as a representative entry by a method other than the two selection methods indicated below.

In a first selection method, the representative selection unit 23 selects as a representative entry an entry that indicates a feature amount datum which has the smallest variance of the similarity degrees with the feature amount data indicated by the other entries. This method can be expressed by the following expression. As expressed by the following expression, The representative selection unit 23 computes, with regard to each of the feature amount data fi that belong to the set F, all the similarity degrees between the feature amount datum fi and the other feature amount data fj, and selects the feature amount datum fi that has the smallest variance value σ of the similarity degree distribution as a representative of the set F. Note that in the first selection method, the entry selected as a representative entry is not restricted to only the entry that indicates a datum that has the smallest variance of the similarity degrees with the various other data. The representative entry may be preferentially selected from entries that indicate data that each has a small variance of the similarity degrees with the various data. For example, the entry that indicates the datum that has the second smallest variance may be selected as a representative entry.

$$\underset{f_i \in F}{\operatorname{argmin}} \{\sigma_{f_i} | \sigma \text{ is the variance of } sim(f_i, f_j), f_j \in F\} \quad \text{[Math. 2]}$$

In a second selection method, the representative selection unit 23 selects as a representative entry an entry that indicates a datum that has the greatest number of data indicated by other entries to which the entry is the nearest neighbor. This method can be expressed by the following expression. With respect to the various feature amount data fi that belong to the set F, the representative selection unit 23 selects as a representative of the set F a feature amount datum fi such that the number RNN (Reverse Nearest Neighbors) (fi) of other feature amount data to which the feature amount data fi is the nearest neighbor is the greatest, as expressed by the following expression. Note that in the second selection method, the entry selected as a representative entry is not restricted to only the entry that indicates a datum such that the aforementioned number of data is the greatest. The representative entry may be preferentially selected from entries that indicate data such that the number of such data is great. For example, the entry that indicates a datum such that the aforementioned number of such data is the second greatest may be selected as a representative entry.

$$\underset{f_i \in F}{\operatorname{argmax}} \{|RNN(f_i)|\} \quad \text{[Math. 3]}$$

The overflow adjustment unit 24 divides that node into a parent node and a child node when the number of entries of a node into which the entry that includes the feature amount datum acquired by the object acquisition unit 20 has been inserted exceeds a predetermined entry threshold value. Dividing a node into a parent node and a child node in this manner will also be called as overflow adjustment. In this case, the overflow adjustment unit 24 causes the representative selection unit 23 to select a representative entry in a node of which the number of entries has exceeded the predetermined entry threshold value, and also causes the threshold setting unit 22 to set a new similarity degree threshold value. The overflow adjustment unit 24 selects an entry that includes a feature amount datum whose similarity degree with the feature amount data included in the representative entry selected by the representative selection unit 23 is greater than or equal to the new similarity degree threshold value set by the threshold setting unit 22, generates a lower order node (child node) that includes the selected entry, and sets a pointer to that lower order node and a new similarity degree threshold value in the representative entry in the original node (parent node). The representative entry may be included in both the child node and the parent node or may be included in only the parent node.

The threshold setting unit 22, similarly to the threshold setting unit 102 in the index generating device 100 described above, sets the similarity degree threshold value to a value that increases with descent in hierarchy. For example, the threshold setting unit 22 sets new similarity degree threshold values using any one of three setting methods indicated below. Note that, this embodiment does not restrict the similarity degree setting method to the methods as mentioned below.

In a first setting method, a new similarity degree threshold value is set to one of values that are at equal intervals from an already set similarity degree threshold value. In other words, in the first setting method, each similarity degree threshold value is set respectively by dividing a similarity degree range of 0 to 1 at equal intervals. For example, a similarity degree range section of [0, 1] is divided into 10 equal divisions at equal intervals of 0.1, and similarity degree threshold values are set to the values of the individual dividing points. In this case, the similarity degree threshold values are set to values of 0.1, 0.2, 0.3, . . . , 0.9, and 1.0.

In a second setting method, a new similarity degree threshold value is set to a value obtained by recursive division between the greatest similarity degree and an already set similarity degree threshold value. In other words, in the second setting method, the similarity degree threshold values are individually set by recursively dividing the similarity degree range of 0 to 1 on a logarithmic scale. For example, the first similarity degree threshold value is set to 0.2, and the second similarity degree threshold value is set to a dividing point of 0.6 obtained by dividing the range of 0.2 to 1.0 into two equal divisions. The division into two equal divisions is repeated in this manner, so that the third and later similarity degree threshold values are set to 0.8, 0.9, 0.95, 0.975, 0.9875, and so on.

In the third setting method, a new similarity degree threshold value is set to a value obtained from the similarity degrees between the representative feature amount datum and the other feature amount data in the set of data to which the representative feature amount datum belongs. For example, the similarity degree that becomes a median of a plurality of similarity degrees computed is set as a new similarity degree threshold value. Specifically, when the similarity degrees between a representative feature amount datum and five feature amount data included in a set of data are 0.5, 0.3, 0.6, 0.9 and 0.95, respectively, a new similarity degree threshold value is set to the median of 0.6. In addition, the interval between the greatest value and the smallest value among a plurality of similarity degrees computed may be divided into two equal divisions, and the dividing point may be set as a new similarity degree threshold value.

The similarity computation unit 25 computes a similarity degree between two feature amount data. In this exemplary embodiment, the similarity degree computation technique by the similarity computation unit 25 is not restricted. The similarity computation unit 25 may compute the similarity degree by using a library, an API (Application Programming Interface) whose internal processing is formed as a black box and which is provided from outside, or the like.

The database 35 stores a feature amount data group as an index object, information about a similarity degree tree generated by the index generating unit 21, and information related to the similarity degree tree (a similarity degree computed for generation of a similarity degree tree, or the like). When the data group that becomes an index object is data about a certain attribute which form table format data, the database 35 may store the table format data. The database 35 is implemented on an eternal memory, such as a hard disk, which is included in the memory 11. In addition, in order to accelerate a search and generation of a similarity degree tree, information about nodes other than the leaf nodes of the similarity degree tree stored in the database 35 is buffered in a main storage that is included in the memory 11.

The search unit 30 searches for a feature amount datum that conforms to the similarity degree condition with regard to the search object data in a feature amount data group stored in the database 35 by using a similarity degree tree generated by the index generating unit 21. Data as a search result may be output to a display device or a print device via the input-output I/F 12, may be stored into a portable type recording medium via the input-output I/F 12, or may be sent to another computer via the communication device 13.

As illustrated in FIG. 4, the search unit 30 includes a condition acquisition unit 31, a similarity computation unit 32, and a search processing unit 33.

The condition acquisition unit 31 acquires a similarity degree condition and a feature amount datum regarding a search object. The feature amount datum about a search object may be information input by a user operating an input device on the basis of an input display screen or the like, or may be information acquired from a portable type recording medium, another computer or the like through the input-output I/F 12 or the communication device 13.

The similarity computation unit 32 is substantially the same as the similarity computation unit 25. In the search device 1, the similarity computation unit 25 and the similarity computation unit 32 may be a single processing unit that is shared.

The search processing unit 33 compares the similarity degree acquired by the similarity computation unit 32 with the similarity degree threshold value or the similarity degree condition acquired by the condition acquisition unit 31. Based on a result of this comparison, the search processing unit 33 excludes the entry that has that similarity degree threshold value and the entries of the child node and its lower order nodes that are linked to the entry that includes the similarity degree threshold value from extraction objects (search results) that conform to the similarity degree condition regarding the feature amount data of the search object. However, the search processing unit 33 may employ a breadth-first search method that checks all the entries included in a node that is reached, or may employ a depth-first search method that checks the entries of the child node of the link destination in preference over other entries in the same node.

(Example of Operation)

First, an index generating method in Exemplary Embodiment 1 will be described by using FIG. 5 and FIG. 6. In the following description, the search device 1 is a subject that executes individual methods. However, the above-described processing units included in the search device 1 may be subjects that execute.

Figure 5:
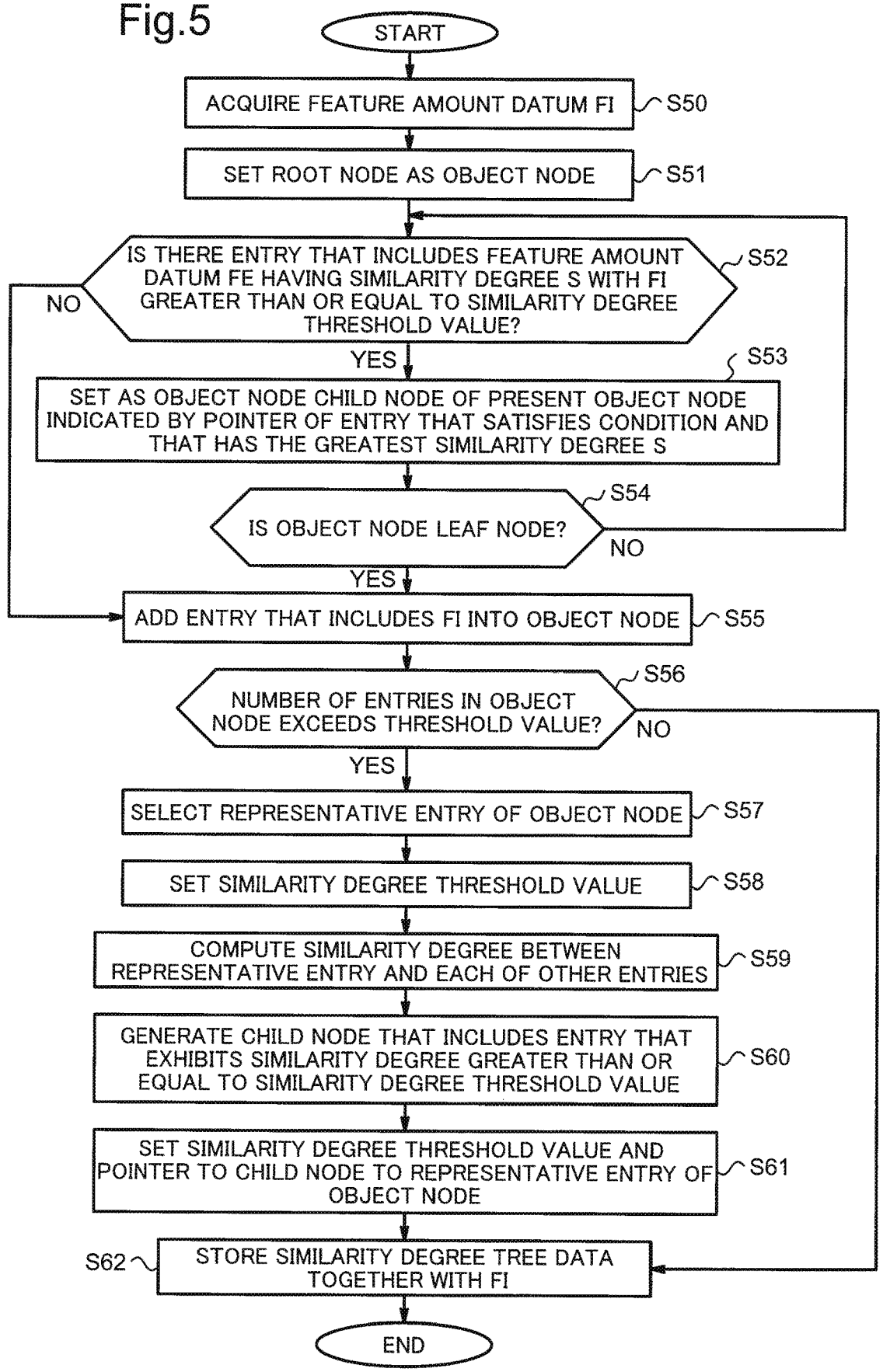
FIG. 5 is a flowchart illustrating an example of operation of the high-dimensional data search device regarding index generation processing.

FIG. 5 is a flowchart illustrating an example of operation of the search device 1 regarding the index generation processing. It is assumed herein that a root node that includes at least one entry in which a pointer to a child node and a similarity degree threshold value have been set has already been generated. In addition, the search device 1 has already possessed various parameters regarding the generation of a similarity degree tree before starting the index generation processing, although not indicated in FIG. 5. The parameters include an entry threshold value, a selection method for a representative entry, and a setting method for a similarity degree threshold value. The parameters may include a threshold value of the depth of the hierarchy of the similarity degree tree.

The search device 1 acquires a feature amount datum fi that becomes an index object (S50).

Subsequently, the search device 1 sets a root node as an object node (S51). The object node means a node that becomes an insert candidate for an entry that indicates the feature amount datum fi. In this manner, the search device 1 selects an insert candidate for an entry sequentially from a higher order node to a lower order node.

The search device 1 computes, with respect to each of the entries that are included in an object node and include a pointer to a child node, a similarity degree S of the feature amount datum fe included in the entry with the feature amount datum fi, and specifies an entry that includes a feature amount datum fe of which the similarity degree S is greater than or equal to the similarity degree threshold value (S52). When there exists an entry that includes a feature amount datum fe of which the similarity degree S is greater than or equal to the similarity degree threshold value in the object node (YES in S52), the search device 1 sets as an object node a child node indicated by the pointer of an entry that has the greatest similarity degree S among the specified entries (S53).

When the object node is not a leaf node (NO in S54), the search device 1 re-executes step (S52) and subsequent steps. When the object node is a leaf node (YES in S54) or when no corresponding entry exists in the object node (NO in S52), the search device 1 adds an entry that includes the feature amount datum fi to the object node (S55).

The search device 1 determines whether the number of entries in the object node into which the entry has been added exceeds a predetermined entry threshold value (S56). When the number of entries in the object node exceeds the predetermined entry threshold value (YES in S56), the search device 1 divides the entries included in that object node into a parent node and a child node in the following manner.

The search device 1 selects a representative entry from the entries of the object node (S57). As for the selection method for a representative entry, for example, one of the two selection methods as described above is utilized. The population of entries from which a representative entry is selected may be all the entries included in the object node, or may be only entries that do not include a pointer to a lower order node among all the entries included in the object node.

The search device 1 sets a similarity degree threshold value that is to be set in the selected representative entry (S58). As for the setting method for a similarity degree threshold value, for example, any one of the three setting methods as described above is utilized.

The search device 1 computes similarity degrees between the feature amount datum included in the representative entry and the individual feature amount data included in the entries other than the representative entry which are included in the population from which the representative entry has been selected (S59).

Subsequently, the search device 1 generates a child node that includes entries each of which has a feature amount datum that exhibits a similarity degree greater than or equal to the similarity degree threshold value (S60). In this case, the search device 1 deletes the entry added into the child node from the object node. In addition, when the population of entries from which the representative entry has been selected is all the entries included in the object node and the selected representative entry has already possessed a pointer to a child node, the search device 1 may add into the existing child node an entry that has a feature amount datum that exhibits a similarity degree that is greater than or equal to the similarity degree threshold value, instead of newly generating a child node.

The search device 1 sets a pointer to the child node generated in (S60) and the similarity degree threshold value set in (S58) in the representative entry of the object node (S61).

When the number of entries in the object node does not exceed the predetermined entry threshold value (NO in S56) or after completion of (S61), the search device 1 stores similarity degree tree data in the database 35 together with the feature amount datum fi. The search device 1 may reflect in the database 35 only the data about updated sites in the similarity degree tree data. In addition, before storing the similarity degree tree data, the search device 1 substitutes the feature amount datum fi set in the entry in the leaf node in the similarity degree tree with a pointer to the feature amount datum fi that is stored in the database 35.

Figure 6:
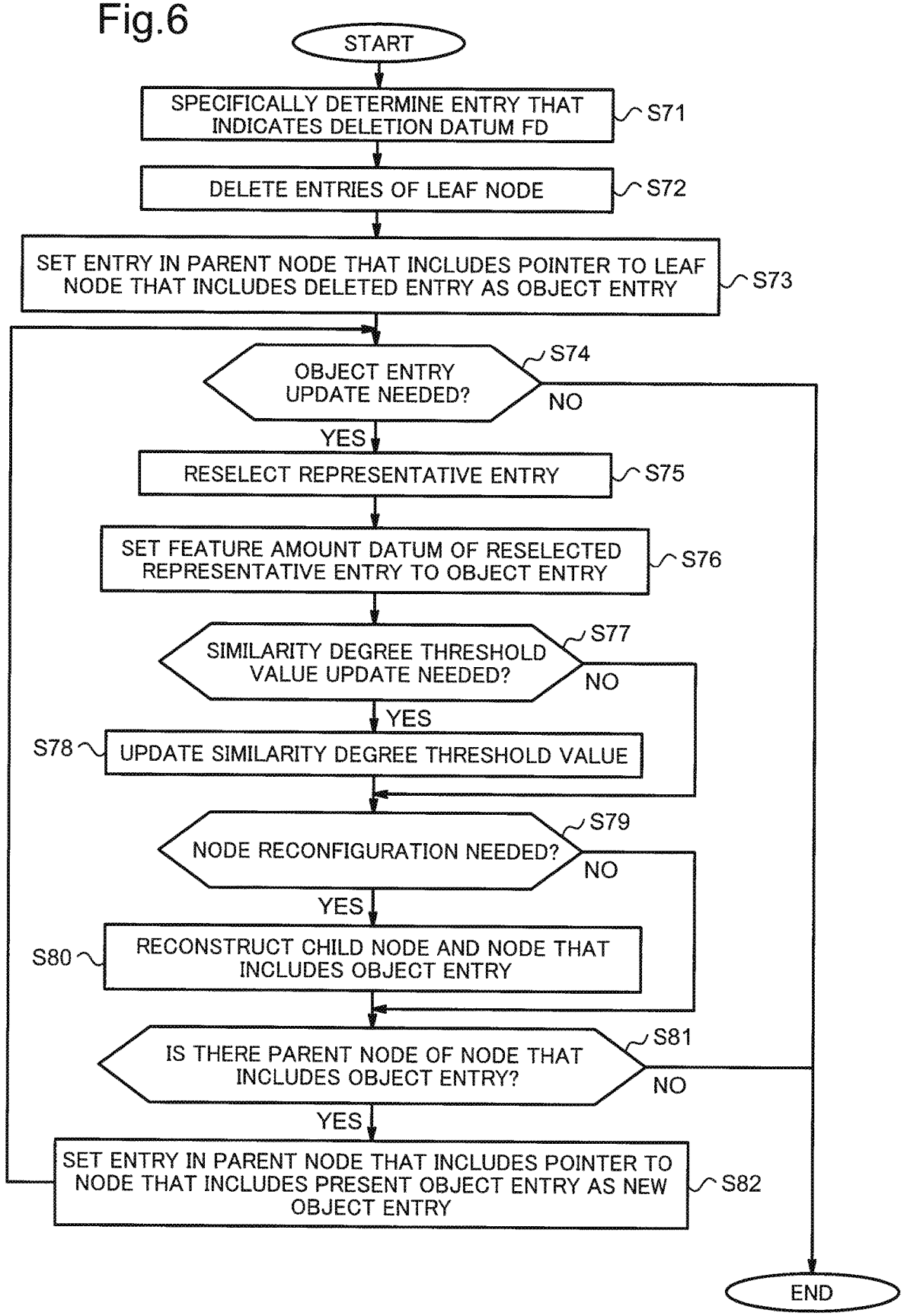
FIG. 6 is a flowchart illustrating an example of operation of the high-dimensional data search device regarding data deletion processing.

FIG. 6 is a flowchart illustrating an example of operation of the search device 1 regarding data deletion processing.

The search device 1, after acquiring a feature amount datum fd that becomes a deletion object (hereinafter, termed deletion datum), specifies an entry that indicates the deletion datum fd (S71). At this time, the search device 1 acquires from the database 35 the feature amount datum indicated by each of entries of the leaf node, by using the pointer included in the entry. It suffices that the specifying method for the deletion datum fd is substantially the same as a similarity search method described later through the use of FIG. 7, and the description is therefore omitted. Note that the similarity degree condition δ is set to 1 (match) in this case.

The search device 1 deletes the entries of the leaf nodes among the specified entries (S72). When the deletion datum fd has been set as a representative of a certain set of data, the specified entries include intermediate nodes. Furthermore, the search device 1 may delete the deletion datum fd from the database 35.

Subsequently, the search device 1 sets as an object entry an entry of a parent node that includes a pointer to a leaf node that includes a deleted entry (S73).

The search device 1 determines whether there is a need to update this object entry (S74). For example, in the case where the object entry includes the deletion datum fd, the case where the selection method for a representative entry executed in (S57) described above depends on the distribution of the values of the set of the feature amount data indicated by the child node, or the like, the search device 1 determines that there is a need to update the object entry (YES in S74).

For example, on the other hand, in the case where the selection method for a representative entry is selection of an arbitrary entry and the object entry does not include the deletion datum fd, the search device 1 determines that there is no need to update the object entry (NO in S74). If the search device 1 determines that there is no need to update the object entry (NO in S74), the search device 1 finishes the data deletion processing.

If the search device 1 determines that there is a need to update the object entry (YES in S74), the search device 1 re-selects a representative entry (S75). The population from which a representative entry is selected is the entries included in the child node of the object entry, for example. However, other entries in the node that includes the object entry may be further added to this population.

The search device 1 updates the original feature amount datum included in the object entry to the feature amount datum of the re-selected representative entry (S76).

The search device 1 further determines whether there is a need to update the similarity degree threshold value set in that object entry (S77). For example, when the setting method for the similarity degree threshold value which is executed in (S58) described above depends on the similarity degree regarding the population from which a representative entry is selected, as in the third setting method described above, the search device 1 determines that there is a need to update the similarity degree threshold value (YES in S77). If the search device 1 determines that there is a need to update the similarity degree threshold value (YES in S77), the search device 1 sets a new similarity degree threshold value and updates the original similarity degree threshold value of the object entry to this new similarity degree threshold value (S78).

The search device 1 determines whether there is a need to re-construct the node that includes the object entry and the present child node of the object entry based on the similarity degree threshold value and the feature amount datum set in the object entry (S79). Specifically, the search device 1 compares the similarity degree between the feature amount datum of the object entry and the feature amount datum of another entry of the same node with the similarity degree threshold value set in the object entry, and determines whether to move the another entry included in the object node to the present child node. For example, it is determined that an entry that exhibits a similarity degree that is greater than or equal to the similarity degree threshold value needs to be moved to the child node.

The search device 1 reconstructs the node that includes the object entry and the child node of the object entry (S80) by moving from the node that includes the object entry another node to the child node.

Subsequently, the search device 1 determines whether a parent node of the node that includes the object entry exists (S81). Specifically, the search device 1 determines whether an intermediate node that has an entry which includes a pointer to the node that includes the object entry exists.

When a parent node of the node that includes the object entry exists (YES in S81), the search device 1 sets as a new object entry an entry in the parent node which includes a pointer to the node that includes the present object entry (S82). With regard to this new object entry, the search device 1 executes the step (S74) and subsequent steps. The search device 1 reflects in the database 35 the datum at the site where update has been performed, among the similarity degree tree data.

Figure 7:
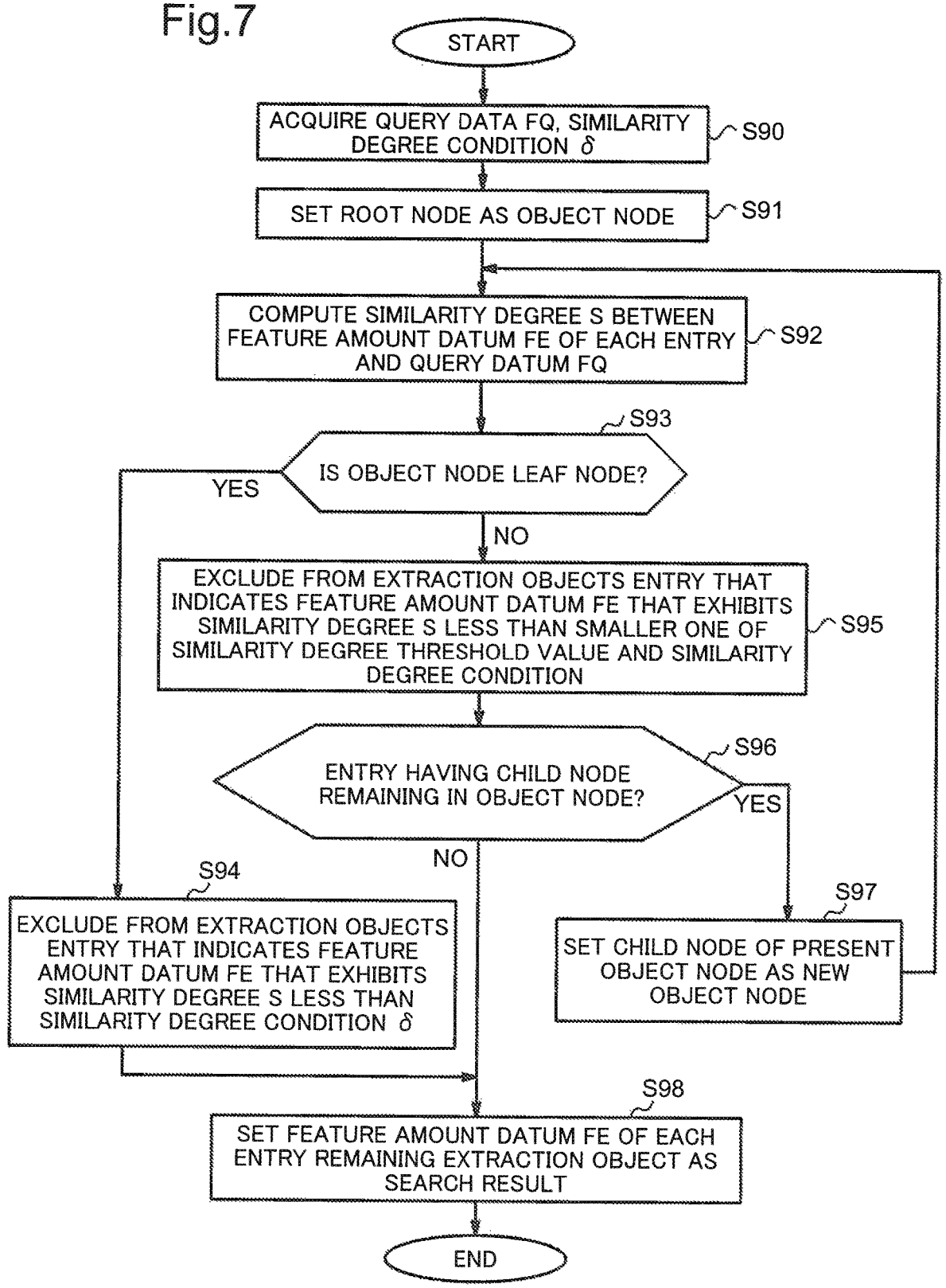
FIG. 7 is a flowchart illustrating an example of operation of the high-dimensional data search device regarding similarity search processing.

Next, a similarity search method in Exemplary Embodiment 1 will be described through the use of FIG. 7. FIG. 7 is a flowchart illustrating an example of operation of the search device 1 regarding similarity search processing.

The search device 1 acquires the similarity degree condition δ and the feature amount datum (hereinafter, called query datum fq) of the search object (S90). The thus-acquired datum requires that feature amount data that exhibit similarity degrees with the query data fq greater than or equal to the similarity degree condition δ be extracted from the database 35.

The search device 1 sets a root node as the object node (S91). The object node means a node that becomes a candidate for comparison with the query datum fq. In this manner, the search device 1 selects comparison candidates sequentially from a higher order node to a lower order node.

The search device 1 computes a similarity degree S between the feature amount datum fe of each entry in the object node and the query datum fq (S92).

When the object node is a leaf node (YES in S93), the search device 1 excludes entries that each indicate the feature amount datum fe which exhibits a similarity degree S less than the similarity degree condition δ among the entries included in the object node from extraction objects (S94).

On the other hand, when the object node is not a leaf node (NO in S93), the search device 1 excludes entries that each indicate the feature amount datum fe which exhibits a similarity degree S less than the smaller one of the similarity degree threshold value and the similarity degree condition δ among the entries included in the object node from extraction objects (S95).

The search device 1 determines whether an entry that has a child node remains in the object node without being excluded (S96). When an entry that has a child node remains (YES in S96), the search device 1 sets the child node of the present object node as a new object node (S97). With respect to this new object node, the search device 1 executes (S92) and subsequent steps.

The search device 1 sets the feature amount datum fe of each entry that remains extraction object as a search result (S98).

Although the similarity search method described above is a method that employs a breadth-first search method, a depth-first search method may also be used. In a similarity search method that uses a depth-first search method, when the object node is an intermediate node (S92), a similarity degree S between the feature amount datum fe of an entry in the object node and the query datum fq is computed. Moreover, after execution of (S94), the intermediate node of the highest order which has an entry that has not been subjected to comparison with the query datum fq is set as a new object node, and (S92) and subsequent steps are further executed.

The index generating method and the similarity search method in this exemplary embodiment are not restricted by the examples indicated in FIG. 5, FIG. 6 and FIG. 7. For example, in the example in FIG. 5, every time a feature amount datum fi is acquired, the feature amount datum fi and a similarity degree tree datum are stored into the database 35. However, the timing of storage of the feature amount datum fi and the similarity degree tree datum into the database 35 is arbitrary. In addition, as for the step of computing a similarity degree such as (S59), a similarity degree computed in the past may be acquired from a holding unit instead of calculating a similarity degree at every time.

(Operation and Advantageous Effects of Exemplary Embodiment 1)

As described above, in Exemplary Embodiment 1, a hierarchized similarity degree tree is generated based on the similarity degree between feature amount data and the foregoing law regarding the similarity degree without depending on the form of the feature amount data that become index objects. Then, based on this similarity degree tree, feature amount data that satisfy a similarity degree condition regarding feature amount data of the search objects are extracted. In addition, in Exemplary Embodiment 1, the similarity degree computation technique itself in the similarity computation unit 25 and the similarity computation unit 32 is not restricted at all. Thus, in Exemplary Embodiment 1, a similarity degree tree that is an index is generated without depending on the data structure or the geometric properties of the index object data. Furthermore, in Exemplary Embodiment 1, generation of the similarity degree tree and the similarity search are executed without depending on the similarity degree computation technique.

Therefore, according to Exemplary Embodiment 1, even in the case where the data structure of index objects is unknown, the case where the feature amount data are high-dimensional data, or the like, the similarity search can be appropriately performed. That is, according to Exemplary Embodiment 1, a general-purpose similarity search technology that does not depend on the data structure of index objects can be provided.

Moreover, in Exemplary Embodiment 1, when reflecting (adding) a new feature amount datum to the similarity degree tree, the similarity degree between the new feature amount datum and the feature amount datum indicated by an entry in an intermediate node which includes a pointer to a lower order node is computed, and the similarity degree and the similarity degree threshold value included in that entry are compared. Then, based on a result of the comparison, an insertion destination of the entry that includes the new feature amount datum is set to that intermediate node or that lower order node. Still further, in Exemplary Embodiment 1, in the case where the number of entries in a node exceeds a restriction (predetermined entry threshold value), overflow adjustment is performed, whereby that node is divided into a parent node and a child node. In the overflow adjustment, a representative entry is selected from the entries in the node, a new similarity degree threshold value to be set in the representative entry is set, and disposal of each entry is set in the child node or the parent node from a relation between the similarity degree between the feature amount datum of the representative entry and the feature amount data of other entries and the new similarity degree threshold value.

In this manner, in Exemplary Embodiment 1, nodes are checked sequentially from a higher order hierarchy to a lower order hierarchy based on the similarity degree in the feature amount datum with each node, so that an entry that corresponds to the feature amount datum of an acquired index object is inserted into an appropriate node. Moreover, nodes are hierarchically divided according to the number of entries of each node.

Therefore, according to Exemplary Embodiment 1, based on the data of index objects, the similarity degree tree can be dynamically generated and updated, regardless of the data scale of the index objects. On the other hand, not many of the proposed technologies described in Background Art support dynamic generation and update of an index. Even an existing technology that supports the dynamic generation and update, such as the R-tree technology, does not easily cope with large-scale data.

Furthermore, in Exemplary Embodiment 1, a feature amount datum (query datum) about a search object and a similarity degree condition are acquired, and a feature amount datum that satisfies the similarity degree condition regarding the query datum is specified by checking the feature amount datum from the higher order node to the lower order node in the similarity degree tree, and then extracted from the database 35. In this case, in an intermediate node, a similarity degree between the feature amount datum indicated by an entry and the query datum is computed, and the similarity degree and the similarity degree condition or the similarity degree threshold value included in that entry are compared. Based on a result of this comparison, that entry in the intermediate node and the entries in lower order nodes as low as or lower than the child node of that entry are excluded from extraction objects.

Thus, in Exemplary Embodiment 1, each entry is checked sequentially from the higher order node in the similarity degree tree, and the entries that do not satisfy the similarity degree condition and the entries of descendant nodes that include the child node of that entry are excluded one by one from extraction objects. Therefore, according to Exemplary Embodiment 1, the nodes to be checked based on the similarity degree tree can be restricted, so that high search efficiency can be realized. In addition, according to Exemplary Embodiment 1, since the similarity degree tree does not depend on the number of dimensions of the feature amount data as described above, the reduction of search efficiency involved in an increase in the number of dimensions of feature amount data can be prevented.

In addition, in Exemplary Embodiment 1, two selection methods as described above have been illustrated as a method of selecting a representative entry in the case of overflow adjustment of a node or the like. The representative entry is a representative of the set of feature amount data indicated by a child node, and is a basis for determining feature amount data that need to be included in that child node together with a similarity degree threshold value, as indicated by the law described above. Hence, in order to attain balance in the number of entries between the parent node and the child node that are related to the feature amount data already registered in the similarity degree tree, it is desirable that the representative entry be located near the center of the set of the feature amount data. According to the foregoing two selection methods, it is possible to attain balance in the number of entries between the parent node and the child node after the node overflow adjustment. Note that when a method for random selection other than the foregoing two selection methods is adopted, the processing load for selection of a representative entry can be reduced, and as the generation of a similarity degree tree progresses after the node overflow adjustment (after the node division), balance in the number of entries between the parent node and the child node is attained.

Moreover, in Exemplary Embodiment 1, three setting methods as described above have been illustrated as a method of setting a similarity degree threshold value at the time of node overflow adjustment or the like. The similarity degree threshold value corresponds to a threshold value of the distance from the representative feature amount datum in the set of the feature amount data indicated by the child node, and is a basis for determining feature amount data that need to be included in that child node together with the representative datum, as indicated by the law described above. According to the methods in the above-described examples in which a new similarity degree threshold value is set from the distribution of the similarity degrees between the representative datum and the feature amount data that have already been registered, balance in the number of entries between the parent node and the child node that are related to the feature amount data that have already been registered in the similarity degree tree can be attained. Note that in other setting methods for a similarity degree threshold value, too, the processing load for setting a similarity degree threshold value can be reduced, and as the generation of a similarity degree tree progresses after the node overflow adjustment (after the node division), balance in the number of entries between the parent node and the child node is attained.

Exemplary Embodiment 2

In Exemplarity Embodiment 1 described above, an entry including a pointer to a child node includes one feature amount datum that becomes a representative of the feature amount data set indicated in the child node. In Exemplary Embodiment 2, a plurality of feature amount data that become representatives are included in such an entry together with a pointer to a child node. An upper limit of the number of feature amount data that become representatives is set to a value that is smaller than the number of feature amount data indicated in the child node, for example. Hereinafter, a search device 1 in Exemplarity Embodiment 2 will be described, with a focus on contents different from those of Exemplary Embodiment 1. In the description below, substantially the same contents as in Exemplary Embodiment 1 will be omitted as appropriate.

Figure 8:
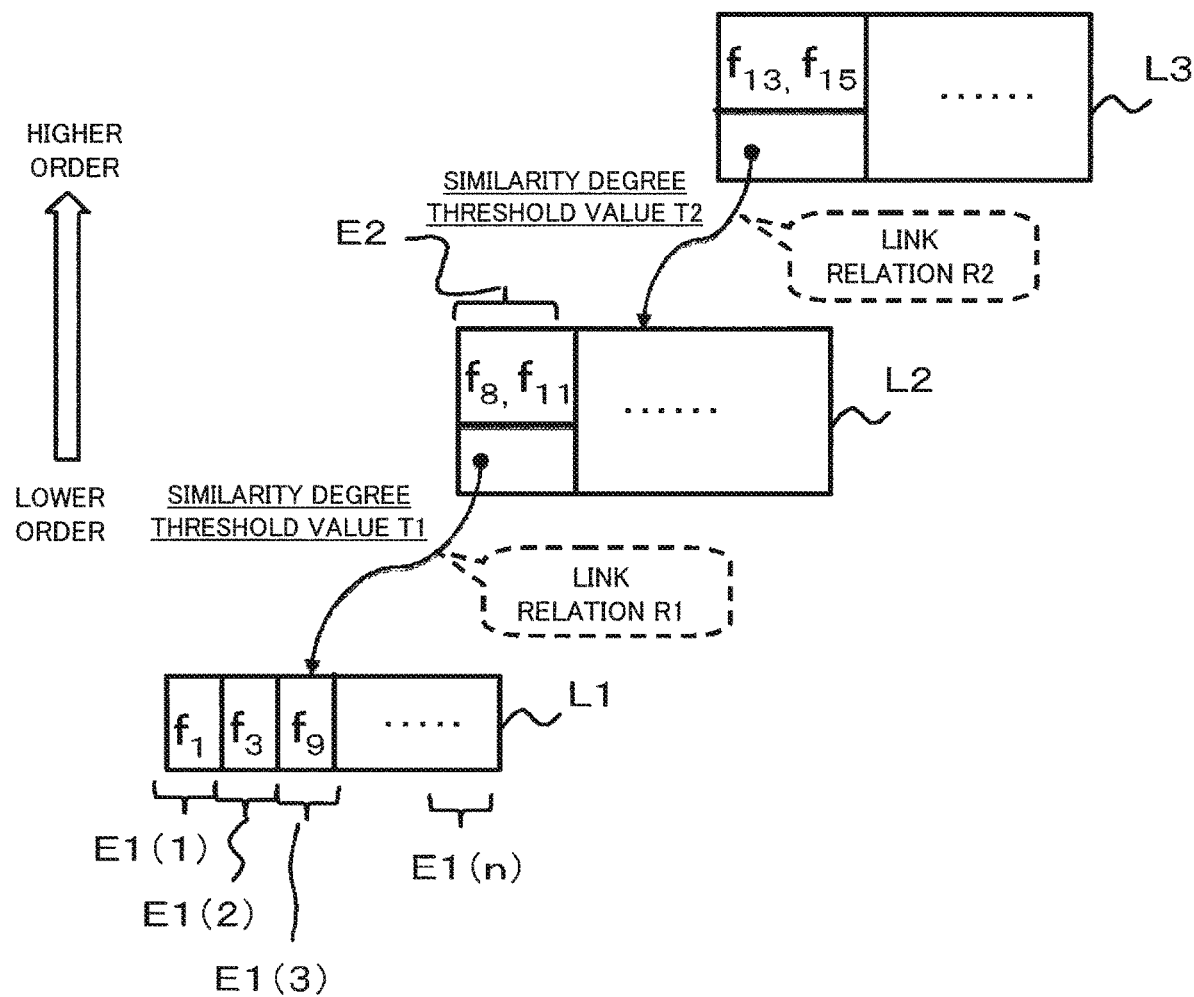
FIG. 8 is a diagram conceptually illustrating an example of a portion of a similarity degree tree in a second exemplary embodiment.

FIG. 8 is a diagram conceptually illustrating an example of a portion of a similarity degree tree in Exemplary Embodiment 2. As illustrated in FIG. 8, in Exemplary Embodiment 2, an entry E2 of a higher order (intermediate) node L2 including a pointer (a link relation R1) to a lower order node L1 includes a similarity degree threshold value T1 and a plurality of feature amount data f8 and f11 that become representatives of a plurality of feature amount data (f1, f3, f9, and so on) indicated in a plurality of entries E1($n$) included in the lower order node L1.

When adding or deleting a feature amount datum, the representative selection unit 23 selects a plurality of feature amount data that become representatives from a plurality of feature amount data included in a certain node, according to need. There are cases where in an intermediate node there coexist an entry that includes a plurality of feature amount data and a pointer to a child node and an entry that does not include a pointer to a child node but includes one feature amount datum. In this case, the representative selection unit 23 may select a plurality of feature amount data that become representatives from the entries that do not include a pointer to a child node. Alternatively, the representative selection unit may select a plurality of feature amount data that become representatives from all the feature amount data of all the entries included in that intermediate node.

For example, the representative selection unit 23 selects a plurality of feature amount data that become representatives, by using either one of two selection methods indicated below. Note that this exemplary embodiment does not restrict the selection method for a plurality of feature amount data that become representatives to methods as described below. The representative selection unit 23 may randomly select a plurality of feature amount data that become representatives.

In a first selection method, the representative selection unit 23 selects a combination of feature amount data between which the value of similarity degree is the greatest as representatives. When two feature amount data are selected as representatives, the representative selection unit 23 selects as representatives a pair of feature amount data between which the value of similarity degree is the greatest.

In the second selection method, the representative selection unit 23 selects a combination of feature amount data between which the value of similarity degree is the smallest as representatives. When two feature amount data are selected as representatives, the representative selection unit 23 selects as representatives a pair of feature amount data between which the value of similarity degree is the smallest.

The threshold setting unit 22 may use a fourth setting method indicated below in addition to the three setting methods in Exemplary Embodiment 1. In the fourth setting method, a new similarity degree threshold value is set to a similarity degree between a feature amount datum that becomes a center of a plurality of representative feature amount data and the other feature amount data.

The index generating unit 21 acquires a similarity degree between the new feature amount datum and each of a plurality of feature amount data indicated by the entries of an intermediate node that includes a pointer to a lower order node, when reflecting the new feature amount datum in the similarity degree tree. Then, the index generating unit 21 compares each of the similarity degrees with the similarity degree threshold value and, based on results of the comparisons, sets the insertion destination of an entry that includes the new feature amount datum to that intermediate node or that lower order node. Specifically, the index generating unit 21 sets the insertion destination of the entry that includes the new feature amount datum to the lower order node if all the similarity degrees are greater than or equal to the similarity degree threshold value. The index generating unit 21 sets the insertion destination of the entry that includes the feature amount datum of this object to the intermediate node if any one of the similarity degrees is less than the similarity degree threshold value. Note that the index generating unit 21 may set the insertion destination of the entry that includes the new feature amount datum to the lower order node if any one of the similarity degrees is greater than or equal to the similarity degree threshold value, and may set the insertion destination of the entry that includes the feature amount datum of this object to the intermediate node if all the similarity degrees are less than the similarity degree threshold value.

The search processing unit 33 compares each of the similarity degrees acquired regarding the feature amount datum of a search object and the plurality of feature amount data included in the entry with the similarity degree threshold value or the similarity degree condition acquired by the condition acquisition unit 31. Then, based on a result of this comparison, the search processing unit 33 excludes the entry that has that similarity degree threshold value and the entries of the child node and its lower order nodes that are linked to the entry that includes the similarity degree threshold value from extraction objects (search results) that conform to the similarity degree condition regarding the feature amount data of the search object. In this case, if all the similarity degrees are less than the smaller one of the similarity degree threshold value and the similarity degree condition, the entry that includes the similarity degree threshold value is excluded from extraction objects.

Operation Example

Hereinafter, an index generating method in Exemplary Embodiment 2 will be described using FIG. 5 and FIG. 6. Exemplary Embodiment 2 is different from Exemplary Embodiment 1 in that a plurality of feature amount data are processing objects in (S52), (S53), (S57), (S59), (S60) and (S61).

Specifically, in (S52), with respect to each entry included in an object node, the search device 1 computes each of similarity degrees S of a plurality of feature amount data fe included in the entry and the feature amount datum fi, and specifies entries that indicate the plurality of feature amount data fe that exhibit a plurality of similarity degrees S greater than or equal to the similarity degree threshold value. Note that the search device 1 may specify entries that indicate a plurality of feature amount data fe that include one feature amount datum that exhibits a similarity degree S greater than or equal to the similarity degree threshold value. In (S53), the search device 1 sets as an object node a child node indicated by a pointer of an entry that has the greatest similarity degree S among the specified entries.

Specifically, in (S57), the search device 1 selects as representatives a plurality of feature amount data from the entries of the object node. In (S59), the search device 1 computes each of similarity degrees between the plurality of feature amount data selected as representatives in (S57) and feature amount data other than the representatives that are included in the population from which the representatives have been selected. In (S60), the search device 1 generates a child node that includes an entry that has a feature amount datum whose similarity degrees with the plurality of feature amount data selected as representatives each exhibit a value greater than or equal to the similarity degree threshold value. Note that the search device 1 may include in the child node an entry that has a feature amount datum whose similarity degree with one of the plurality of feature amount data selected as representatives exhibits a value greater than or equal to the similarity degree threshold value.

In (S61), the search device 1 generates one entry that includes the plurality of feature amount data selected as representatives, deletes the entry having included the representatives, and sets in the generated entry a pointer to the child node generated in (S60) and the similarity degree threshold value set in (S58).

Exemplary Embodiment 2 is different from Exemplary Embodiment 1 in that in (S75), (S76) and (S79), a plurality of feature amount data are processing objects.

In (S75), the search device 1 reselects a plurality of feature amount data that become representatives.

In (S76), the search device 1 sets the reselected plurality of feature amount data in an object entry.

In (S79), the search device 1 compares each of the similarity degrees between the plurality of feature amount data of the object entry and feature amount data of another entries in the same node with the similarity degree threshold value set in the object entry, whereby the search device 1 determines whether to move the another entry included in the object node to the present child node. For example, it is determined that an entry that includes a feature amount datum that exhibits, with respect to the plurality of feature amount data of the object entry, similarity degrees greater than or equal to the similarity degree threshold value need to be moved to the child node. However, it may be determined that an entry that includes a feature amount datum that exhibits, with respect to one of the plurality of feature amount data of the object entry, a similarity degree greater than or equal to the similarity degree threshold value is to be moved to the child node.

Next, a similarity search method in Exemplary Embodiment 2 will be described through the use of FIG. 7. Exemplary Embodiment 2 is different from Exemplary Embodiment 1 in that in (S92) and (S95), a plurality of feature amount data are processing objects.

In (S92), the search device 1, when the object node is an intermediate node, computes each of similarity degrees S between the query data fq and a plurality of feature amount data fe in each entry in an object node. In (S95), the search device 1 excludes from extraction objects an entry that indicates a plurality of feature amount data fe that exhibit a plurality of similarity degrees S less than the smaller one of the similarity degree threshold value and the similarity degree condition δ among the entries included in the object node.

(Operation and Advantageous Effects of Exemplary Embodiment 2)

In Exemplary Embodiment 2, an entry of an intermediate node which includes a pointer to a child node indicates a plurality of feature amount data. Namely, in Exemplary Embodiment 2, a plurality of feature amount data that become representatives of a set of feature amount data indicated in the child node are selected, and the plurality of feature amount data are set in an entry of the parent node. Then, as for the set of feature amount data indicated in the child node, the similarity degrees with all the feature amount data included in the entries of the parent node or one of the feature amount data exhibits a value greater than or equal to the similarity degree threshold value.

Thus, according to Exemplary Embodiment 2, since a plurality of feature amount data indicated in entries of a parent node are used to determine the similarity degrees with the feature amount data set indicated in a child node, the range of similarity degree of the set of data indicated in the child node can be more precisely defined by the entries of the parent node than in Exemplary Embodiment 1.

Furthermore, according to the method in which a plurality of entries that indicates a combination of feature amount data between which the value of similarity degree is the greatest is selected as a plurality of representative entries, even when the variance of the plurality of feature amount data indicated in the plurality of entries is great, the range of similarity degrees of the set of data indicated in a child node can be precisely defined by the entry in the parent node. On the other hand, according to the method in which a plurality of entries that indicates a combination of feature amount data between which the value of similarity degree is the smallest is selected as a plurality of representative entries, even when the plurality of feature amount data indicated by the plurality of entries densely exists, the range of similarity degrees of the set of data indicated in a child node can be precisely defined by the entry in the parent node.

Thus, since the range of similarity degrees of the set of data indicated by a child node can be precisely defined by the entry in the parent node, Exemplary Embodiment 2 makes it easier to attain balance of the similarity degree tree and therefore can improve search efficiency.

Examples are presented below to describe the foregoing exemplary embodiments further in detail. The present invention is not limited at all by the examples below.

Example 1

Example 1 corresponds to Exemplary Embodiment 1 described above. Hereinafter, operations of the search device 1 and the index generating method in Example 1 will be described along with FIG. 5.

Figure 9:
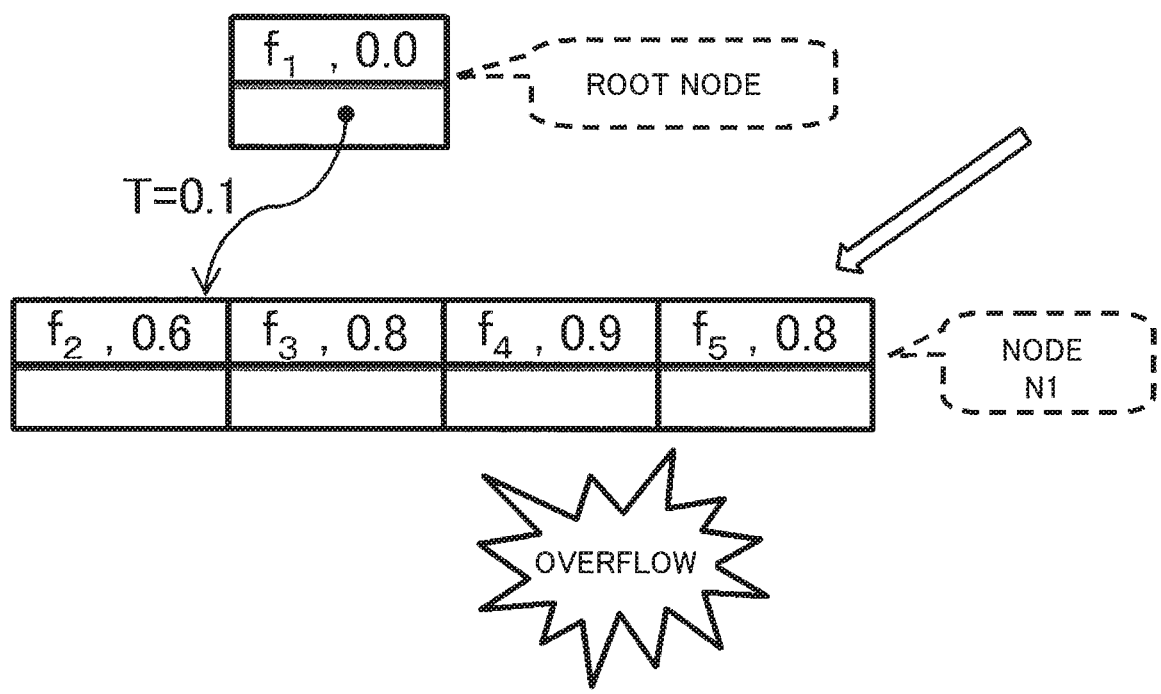
FIG. 9 is a diagram conceptually illustrating an index generation process in Example 1.

FIG. 9 to FIG. 18 are diagrams conceptually illustrating a process of index generation in Example 1. In Example 1, as illustrated in FIG. 9, it is assumed that a root node which has an entry in which a pointer to a child node, a similarity degree threshold value (0.1), and a feature amount datum f1 have been set has already been generated. In addition, it is assumed that the entry threshold value has been set to 3. Moreover, the feature amount data will hereinafter simply called data.

The search device 1 acquires a datum f5 that becomes an index object (S50). After that, because the similarity degree (0.8) between the datum f1 and the datum f5 is greater than the similarity degree threshold value (0.1), the search device 1 sets as an object node a node N1 that is a child node of the root node (S53). Since the node N1 is a leaf node (YES in S54), the search device 1 adds an entry that includes the datum f5 into the object node N1 (S55).

The number of entries (4) of the object node exceeds a predetermined entry threshold value (3) (YES in S56). Thus, the search device 1 performs overflow adjustment. In the overflow adjustment, the search device 1 selects a representative entry of the object node N1 (S57). According to the example in FIG. 10, an entry that includes a datum f2 is selected as a representative entry. Furthermore, the search device 1 sets a new similarity degree threshold value (0.8) (S58).

Figure 10:
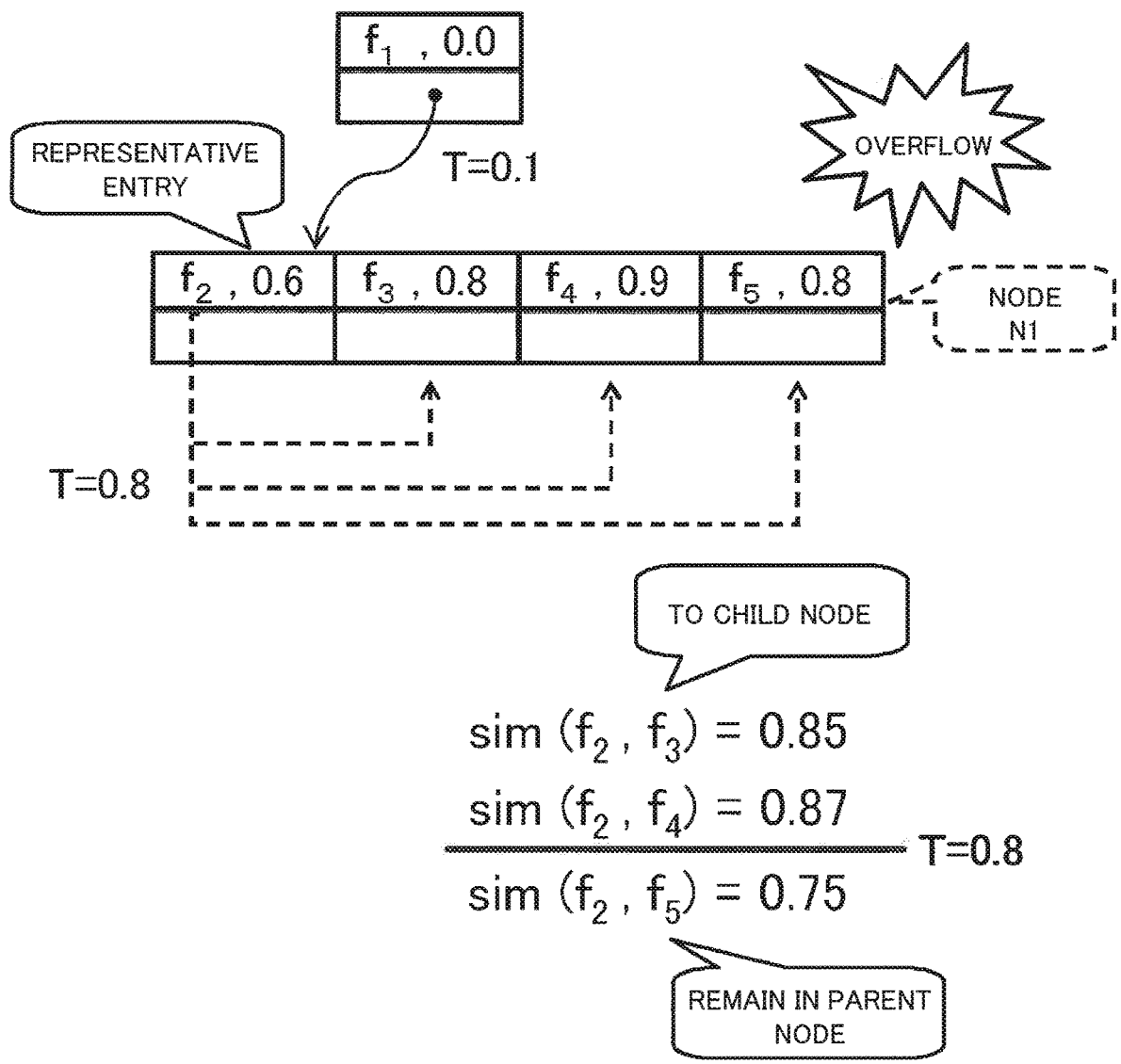
FIG. 10 is a diagram conceptually illustrating an index generation process in Example 1.
Figure 11:
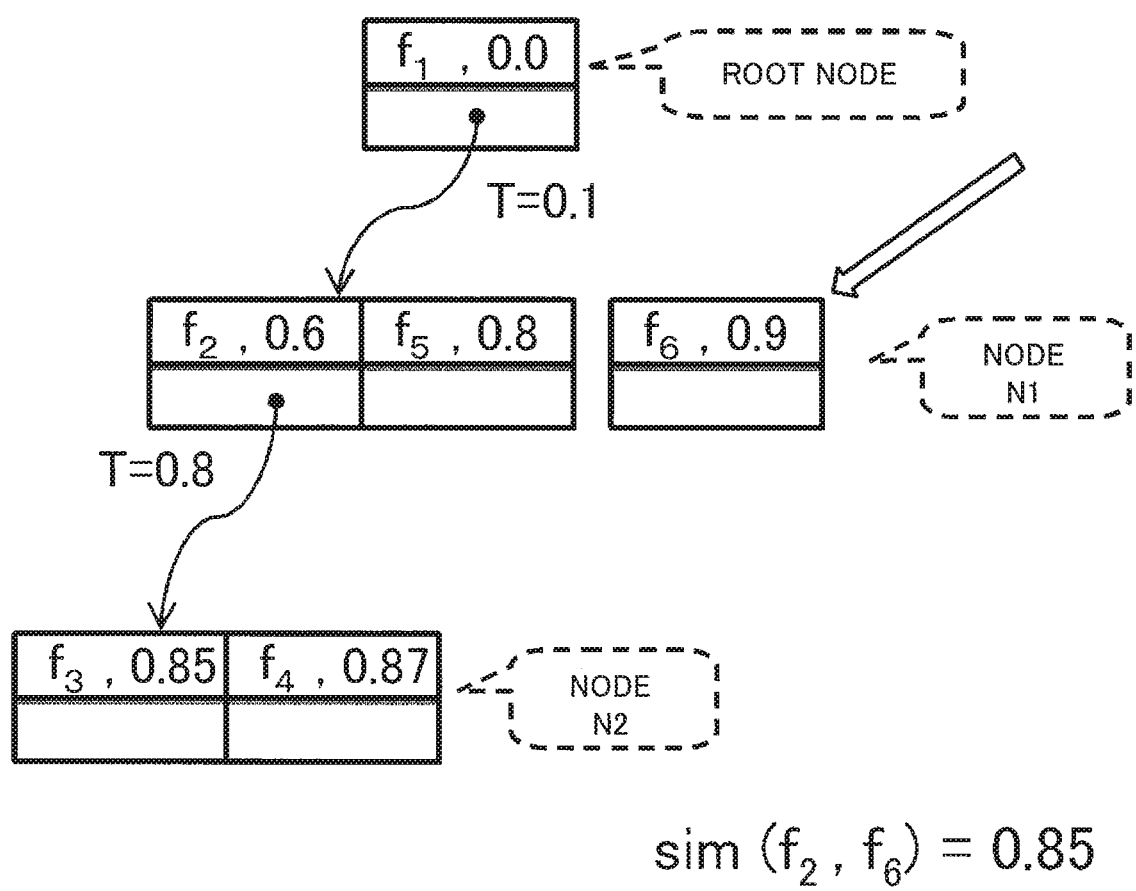
FIG. 11 is a diagram conceptually illustrating an index generation process in Example 1.

The search device 1 computes the similarity degree between the datum f2 of the representative entry and each of data f3, f4 and f5 of the other entries (S59) respectively. Similarity degrees as indicated in the example in FIG. 10 are respectively computed. Due to this, the search device 1, as illustrated in FIG. 11, generates a child node N2 including two entries that have the data f3 and f4 which exhibit similarity degrees greater than or equal to the similarity degree threshold value (0.8) (S60). Moreover, the search device 1 sets a pointer to the child node N2 and the similarity degree threshold value (0.8) in the representative entry of the object node N1 (S61). The search device 1 stores the datum f5 into the database 35, and stores the updated similarity degree tree data into the database 35 (S62).

Subsequently, as illustrated in FIG. 11, the search device 1 acquires a new datum f6 (S50). Because the similarity degree (0.9) between the datum f1 and the datum f6 is greater than the similarity degree threshold value (0.1), the search device 1 sets as an object node the node N1, which is a child node of the root node (S53). Since the node N1 is an intermediate node (NO in S54), the search device 1 computes the similarity degree between the datum f2 included in that entry and the datum f6, with respect to an entry that is included in the object node N1 and that includes a pointer to a child node. In the example in FIG. 11, the similarity degree between the datum f2 and the datum f6 is 0.85, so that the search device 1 specifies an entry that includes the datum f2, which exhibits a similarity degree greater than or equal to the similarity degree threshold value (0.8) (S52).

Figure 12:
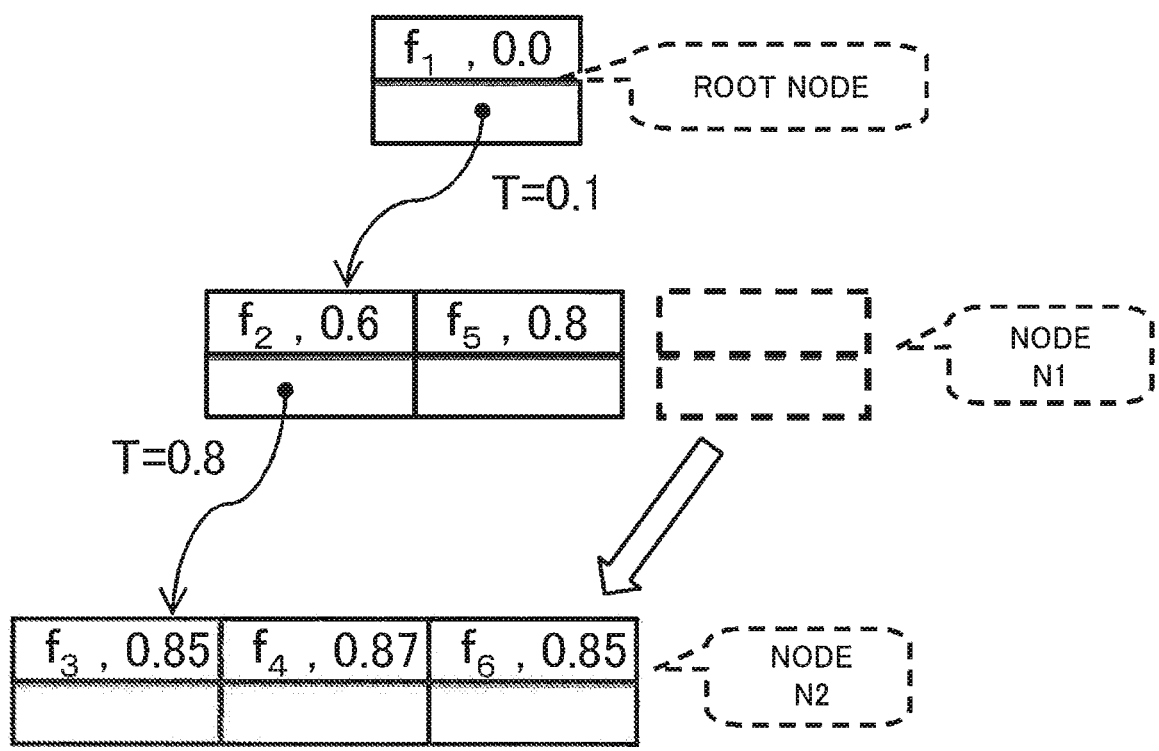
FIG. 12 is a diagram conceptually illustrating an index generation process in Example 1.

The search device 1 sets as an object node a child node N2 indicated by the pointer in the specified entry (S53), and adds the entry that includes the datum f6 into the object node N2 as illustrated in FIG. 12 (S55). Since the number of entries (3) in the object node N2 does not exceed the predetermined entry threshold value (3) (NO in S56), the search device 1 stores the datum f6 and the updated similarity degree tree data into the database 35 (S62).

Figure 13:
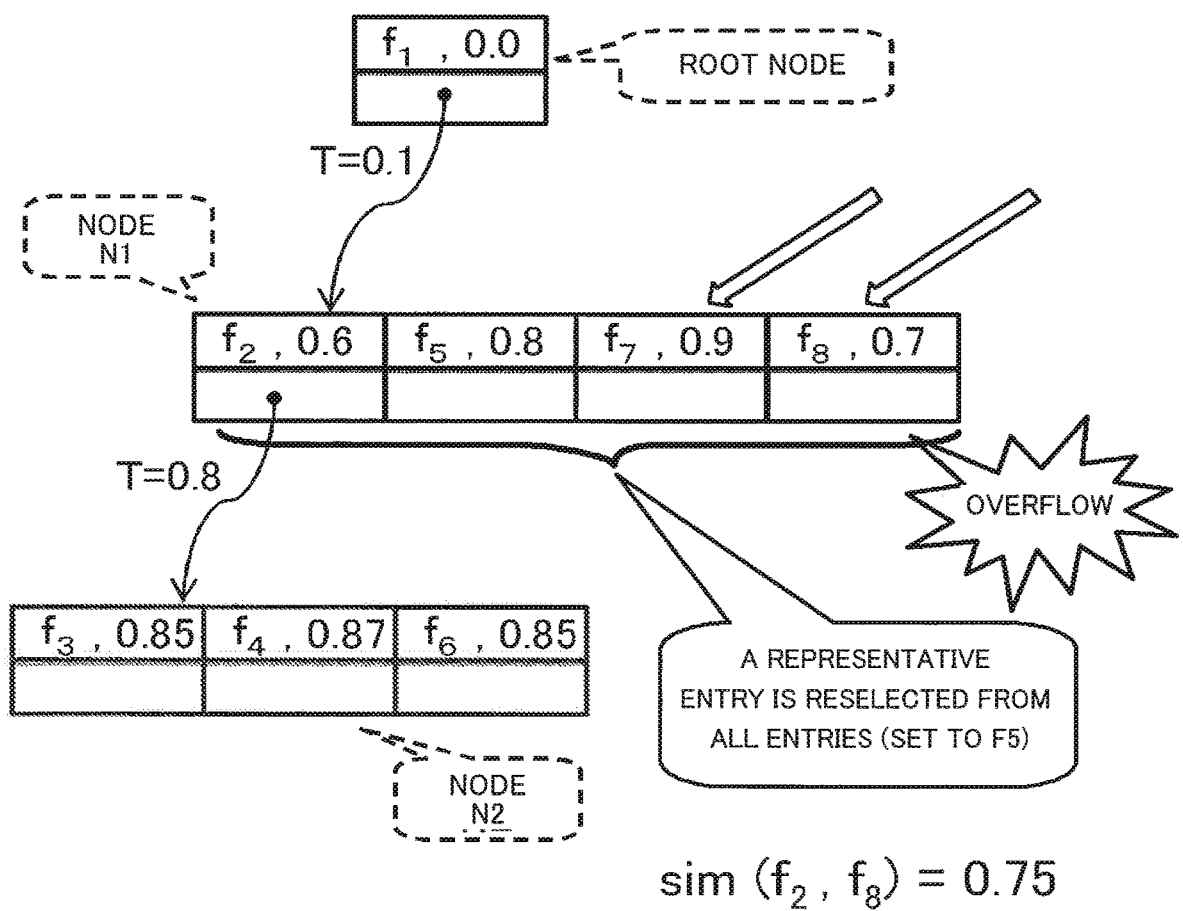
FIG. 13 is a diagram conceptually illustrating an index generation process in Example 1.

Subsequently, an occasion illustrated in FIG. 13 will be described. When a datum f7 has been added in the node N1, the search device 1 acquires a new datum f8 (S50). The similarity degree (0.7) between the datum f1 and the datum f8 is greater than the similarity degree threshold value (0.1), then the search device 1 sets as an object node the node N1, which is a child node of the root node (S53).

Since the node N1 is an intermediate node (NO in S54), with respect to an entry that is included in the object node N1 and that includes a pointer to a child node, the search device 1 computes the similarity degree between the datum f2 included in that entry and the datum f8. In the example in FIG. 13, the similarity degree between the datum f2 and the datum f8 is 0.75, and an entry that includes a datum that exhibits a similarity degree greater than or equal to the similarity degree threshold value (0.8) does not exist in the object node N1. Since no such entry exists in the object node N1 (NO in S52), the search device 1 adds an entry that includes the datum f8 into the object node N1 (S55), as illustrated in FIG. 13.

Since the number of entries (4) in the object node N1 exceeds the predetermined entry threshold value (3) (YES in S56), the search device 1 performs the overflow adjustment. In the example in FIG. 13, the search device 1, handling all the entries included in the object node N1 as the population, selects a representative entry from the population (S57). According to the example in FIG. 13, the entry that includes the datum f5 is selected as a representative entry. In addition, the search device 1 sets a new similarity degree threshold value (0.8) (S58).

Figure 14:
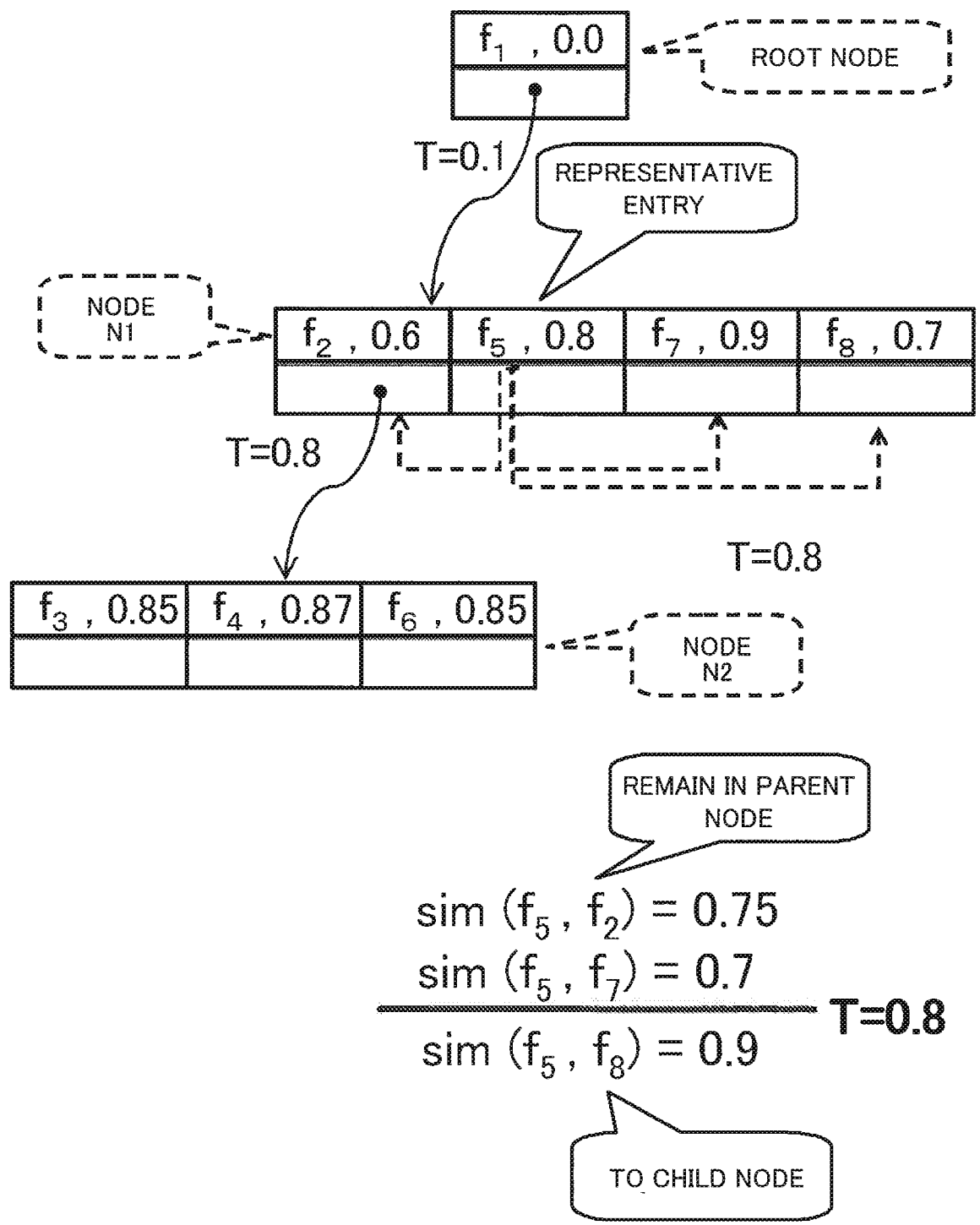
FIG. 14 is a diagram conceptually illustrating an index generation process in Example 1.
Figure 15:
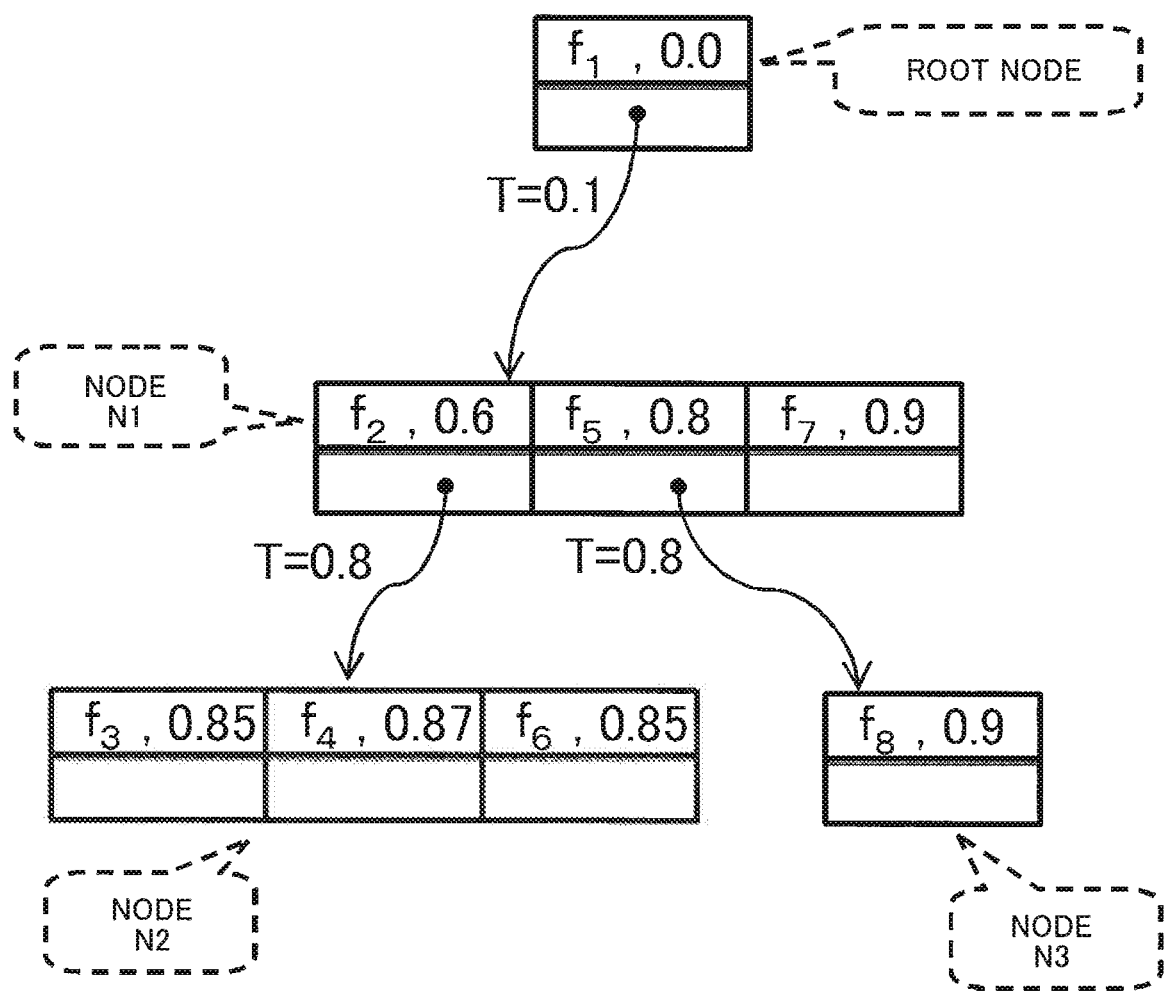
FIG. 15 is a diagram conceptually illustrating an index generation process in Example 1.

The search device 1 computes the similarity degree between the datum f5 of the representative entry and each of the data f2, f7 and f8 of the other entries respectively (S59). Similarity degrees as indicated in the example in FIG. 14 are respectively computed. Due to this, the search device 1, as illustrated in FIG. 14 and FIG. 15, generates a child node N3 that includes one entry that has the datum f8 that exhibits a similarity degree greater than or equal to the similarity degree threshold value (0.8) (S60). Moreover, the search device 1 sets a pointer to the child node N3 and the similarity degree threshold value (0.8) in the representative entry of the object node N1 which includes the datum f5 (S61). In this case, since the search device 1 has determined that the entry that includes the pointer to the node N2 is to remain in the node N1, the search device 1 leaves the pointer and the similarity degree threshold value (0.8) included in that entry as they are. Due to this, the updated similarity degree tree is as illustrated in FIG. 15. The search device 1 stores the datum f8 into the database 35, and also stores the updated similarity degree tree data into the database 35 (S62).

Figure 16:
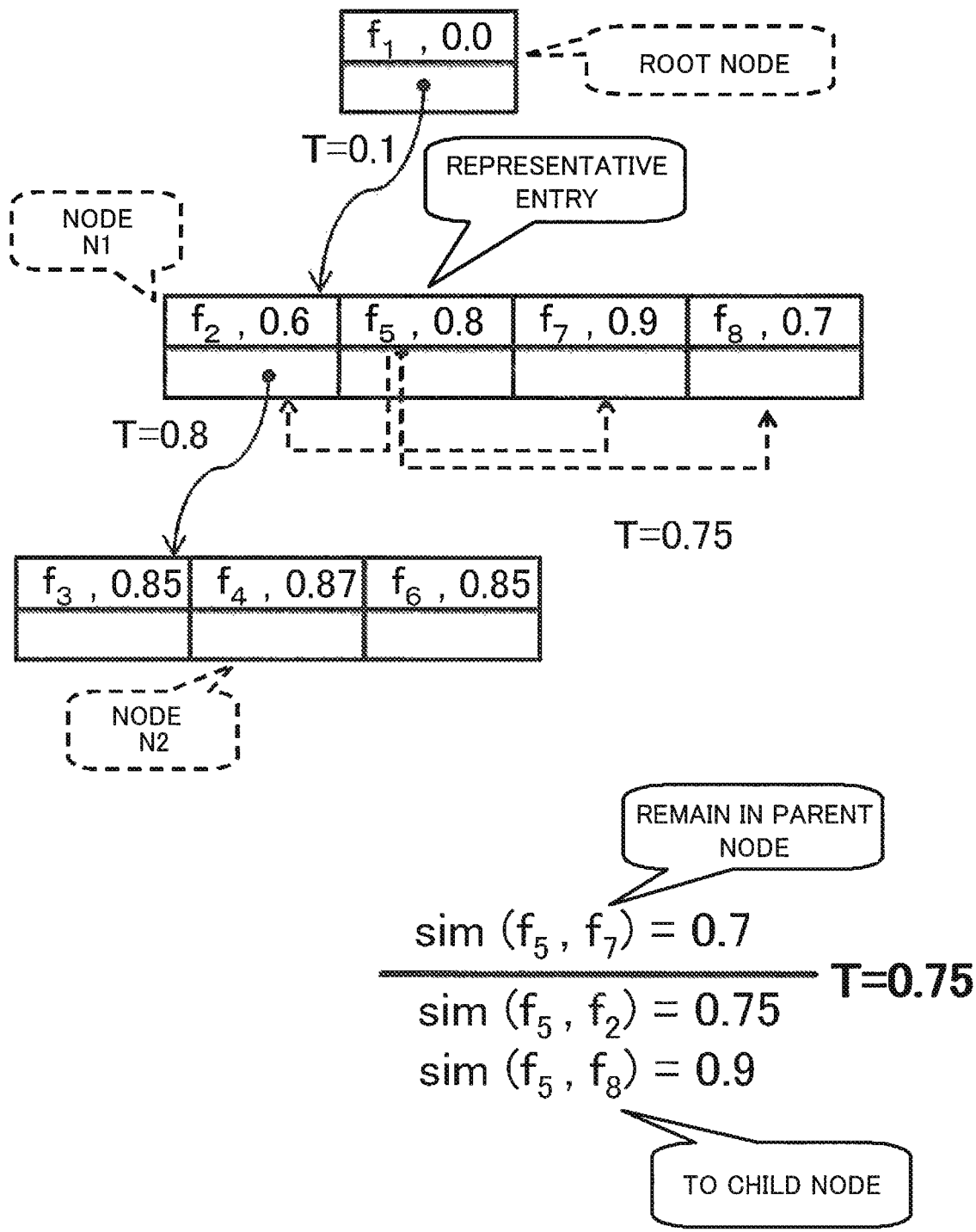
FIG. 16 is a diagram conceptually illustrating an index generation process in Example 1.
Figure 17A:
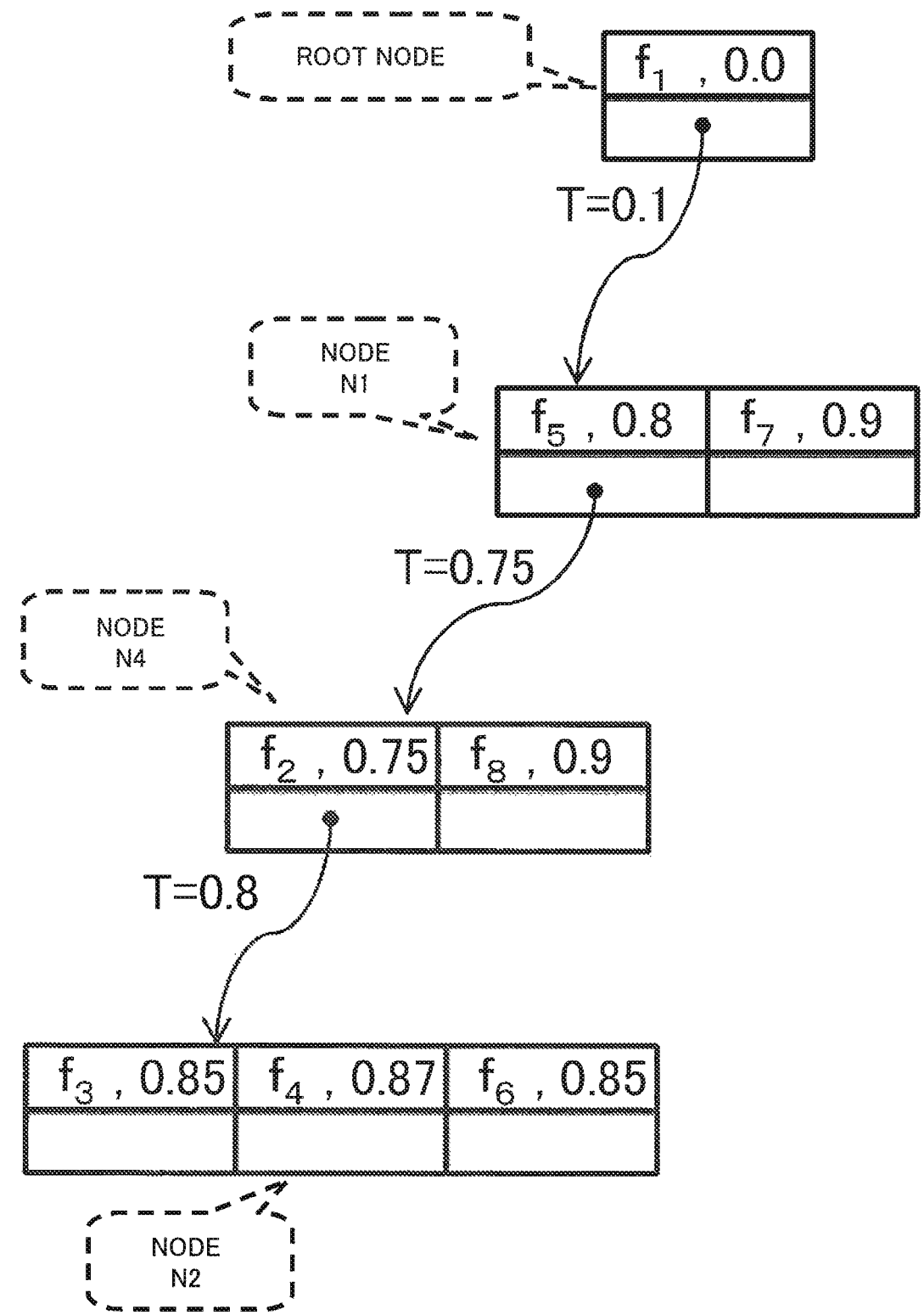
FIG. 17A is a diagram conceptually illustrating an index generation process in Example 1.

FIG. 16 and FIG. 17A are diagrams illustrating an example of index generation different from the example illustrated in FIG. 14 and FIG. 15. In the example in FIG. 14, the representative entry has been set to an entry that includes the datum f5, and a new similarity degree threshold value has been set to 0.8. FIG. 16 illustrates an example in which a new similarity degree threshold value is set to 0.75. In this case, similarity degrees as indicated in the example in FIG. 16 are individually computed.

In this case, the search device 1 determines to move two entries that have the data f2 and f8 that exhibit similarity degrees greater than or equal to the similarity degree threshold value (0.75) to a child node. However, the entry that includes the datum f2 is linked to the child node N2 in this case. Therefore, as illustrated in FIG. 17, the search device 1, while maintaining the similarity degree threshold value (0.8) and the pointer to the child node N2 set in the entry that includes the datum f2 as they are, generates a child node N4 that includes two entries that include the data f2 and f8 (S60), and deletes from the node N1, which becomes a parent node, the two entries that include the data f2 and f8. Furthermore, the search device 1 sets a pointer to the child node N4 and the similarity degree threshold value (0.75) in the representative entry in the object node N1 which includes the datum f5 (S61). As a result, the updated similarity degree tree is as illustrated in FIG. 17A. The overflow adjustment of a node can be realized by simple processing by maintaining the already set link relation as illustrated in FIG. 17A.

Figure 17B:
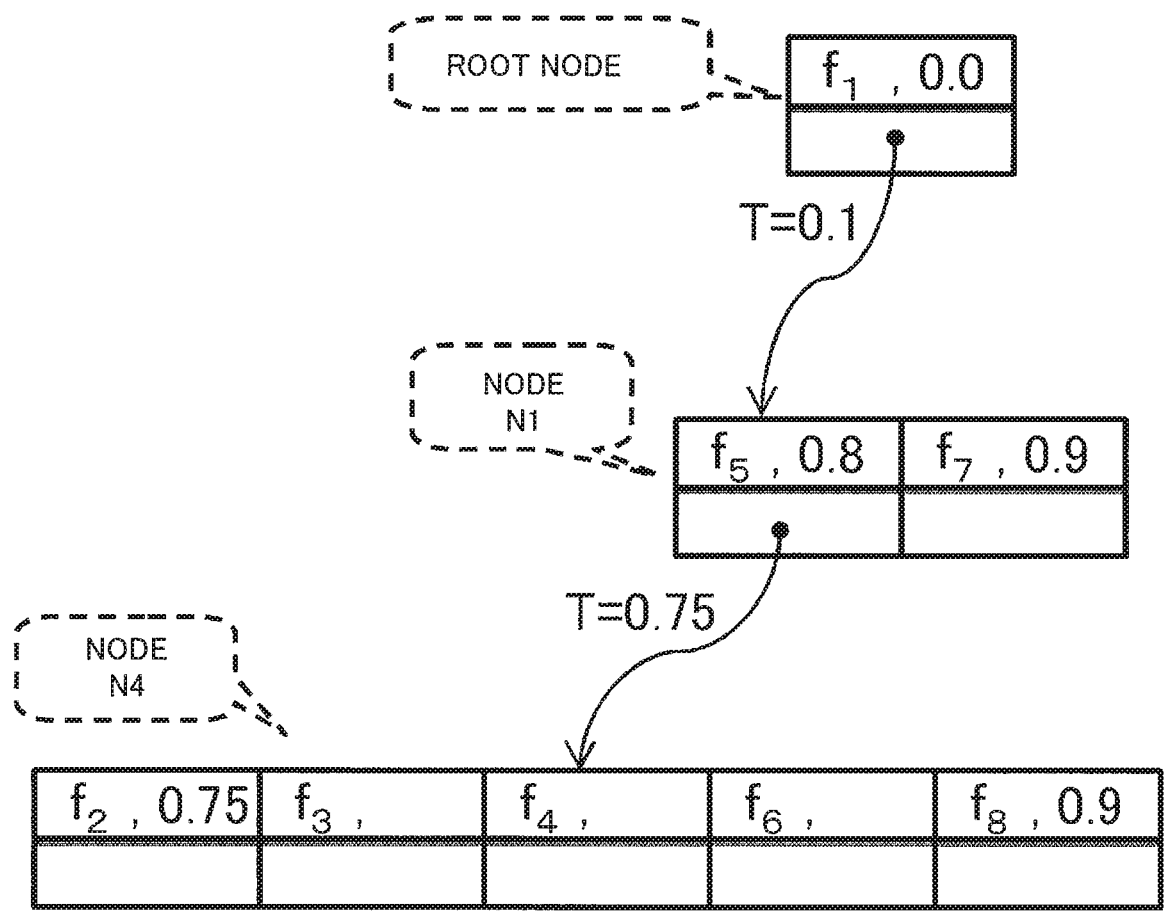
FIG. 17B is a diagram conceptually illustrating an index generation process in Example 1.

FIG. 17B is a diagram illustrating an example of index generation different from the example illustrated in FIG. 17A. During the overflow adjustment of a node, the search device 1 has determined to move an entry already linked to a child node to the child node, the already set link relation may be cancelled as illustrated in FIG. 17B. In this case, as illustrated in FIG. 17B, the search device 1 generates a child node N4 that includes two entries which include the data f2 and f8 and three entries (that include the data f3, f4 and f6) that are included in the child node N2 (S60), and deletes the two entries that include the data f2 and f8 from the node N1 which becomes a parent node.

In the examples in FIG. 16, FIG. 17A and FIG. 17B, the similarity degrees of the data f5 included in the representative entry and individual ones of the data f3, f4 and f6 included in the node N2 do not need to be calculated during the overflow adjustment of the node N1. This is based on the law described above. Namely, when the datum f2 is a representative datum that exhibits similarity degrees greater than or equal to the similarity degree threshold value (0.8) with respect to individual ones of the data f3, f4 and f6 and the representative datum f2 and the datum f5 exhibit a similarity degree greater than or equal to the new similarity degree threshold value (0.75), the possibility that the datum f5 and the set of data (f3, f4 and f6) of the representative datum f2 will exhibit a similarity degree greater than or equal to the new similarity degree threshold value (0.75) is high.

Figure 18:
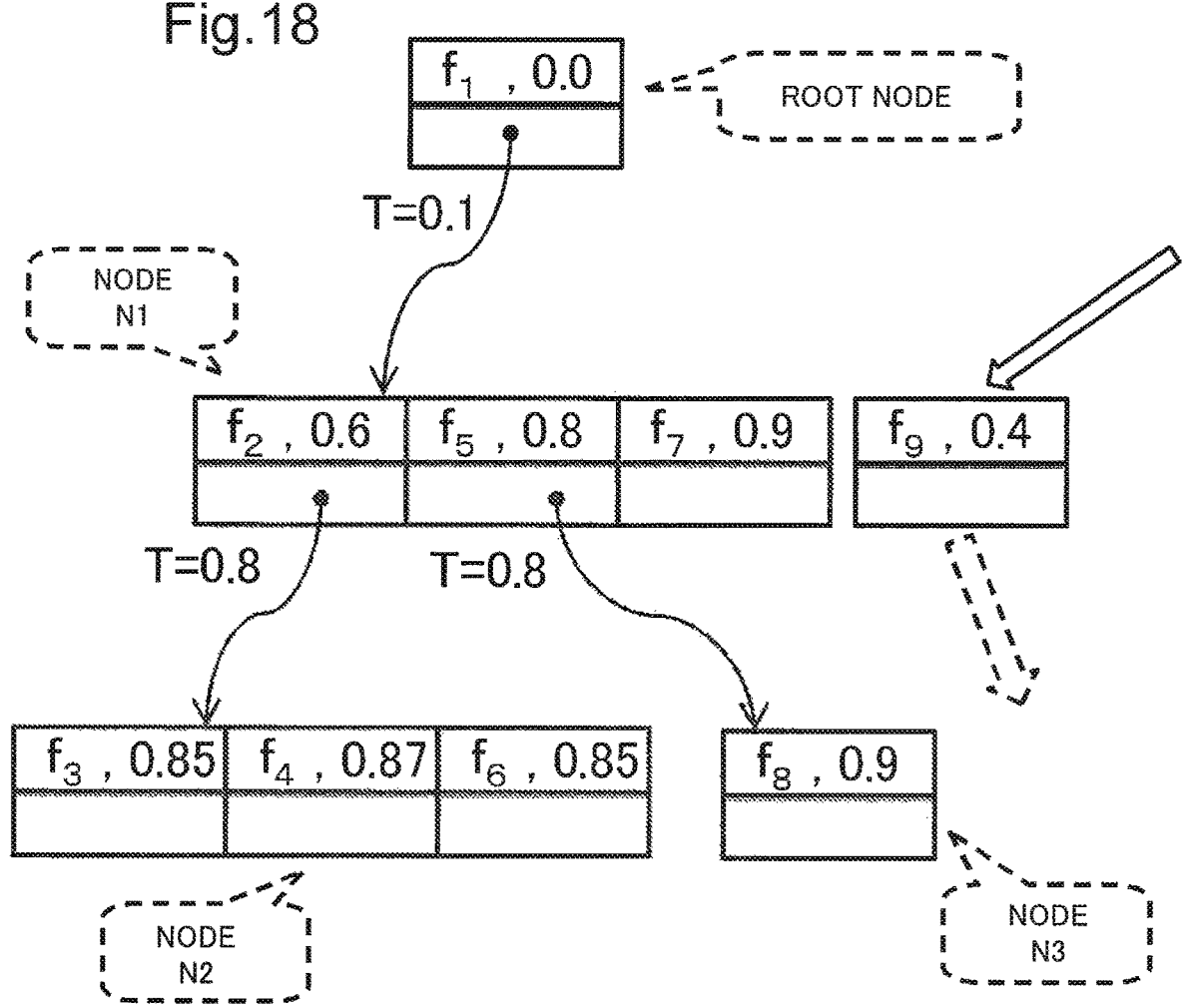
FIG. 18 is a diagram conceptually illustrating an index generation process in Example 1.

FIG. 18 is a diagram conceptually illustrating an index generation process when a new datum f9 is acquired during a state in which the similarity degree tree illustrated in FIG.

15 has already been generated. In this case, with respect to two entries that are included in the object node N1 and that include a pointer to a child node, the search device 1 calculates similarity degrees of the data f2 and f5 included in those entries and the datum f9 respectively. In the example in FIG. 18, the similarity degree between the datum f2 and the datum f9 is 0.85, and that similarity degree is greater than the similarity degree threshold value (0.8) of the entry of the datum f2. In addition, the similarity degree between the datum f5 and the datum f9 is 0.86, and that similarity degree is greater than the similarity degree threshold value (0.8) of the entry of the datum f5. In other words, there exist a plurality of entries that apply in (S52) (YES in S52).

In this case, the search device 1 specifies an entry that satisfies the condition of (S52) and that has the greatest similarity degree with the datum f9, that is, an entry that includes the datum f5. The search device 1 sets the child node N3 indicated by the pointer in the entry that includes the datum f5 as an object node (S53). The search device 1 adds an entry that includes the datum f9 into the object node N3 (S55).

Example 2

Example 2 corresponds to Exemplary Embodiment 2 described above. Hereinafter, operations of the search device 1 and the index generating method in Example 2 will be described along with FIG. 5. Example 2 illustrates an example in which an entry including a pointer to a child node includes two feature amount data that become representatives of a feature amount data set indicated in the child node. In addition, Example 2 illustrates an example in which data, whose similarity degrees with each of the two feature amount data of an entry that includes a pointer to a child node are greater than or equal to a similarity degree threshold value respectively, are caused to be objects of addition into the child node.

Figure 19:
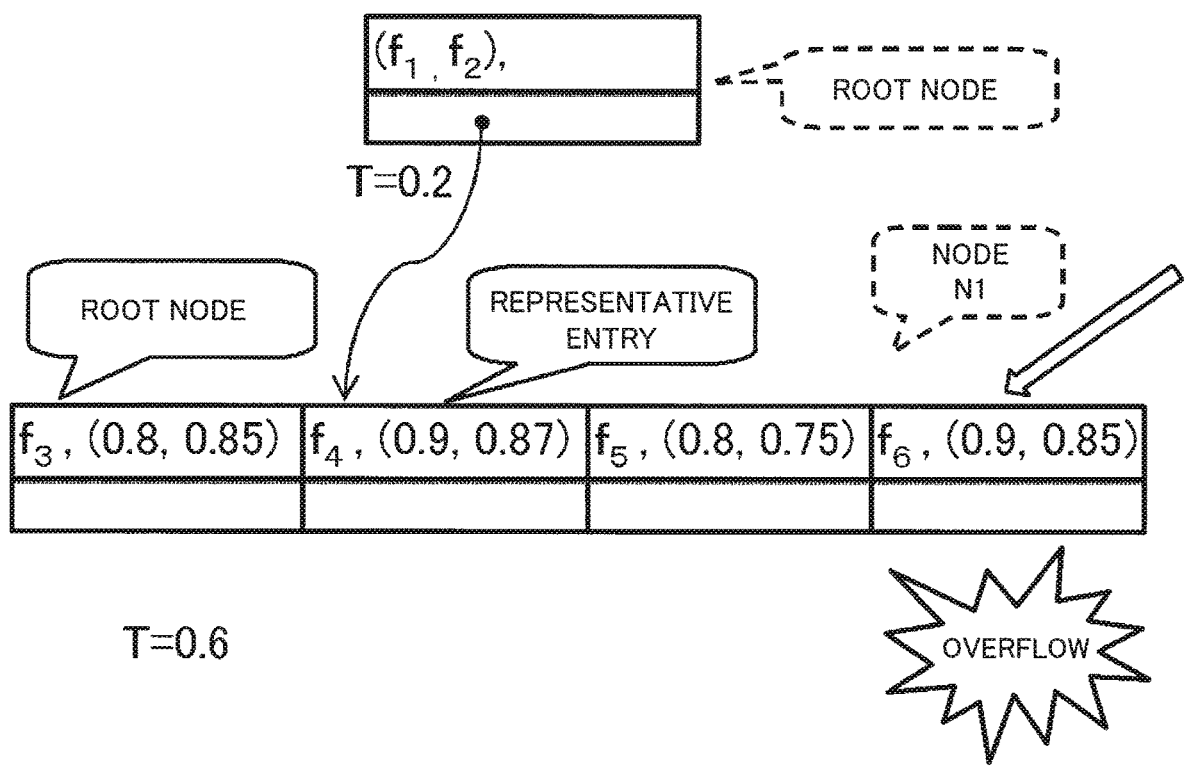
FIG. 19 is a diagram conceptually illustrating an index generation process in Example 2.
Figure 20:
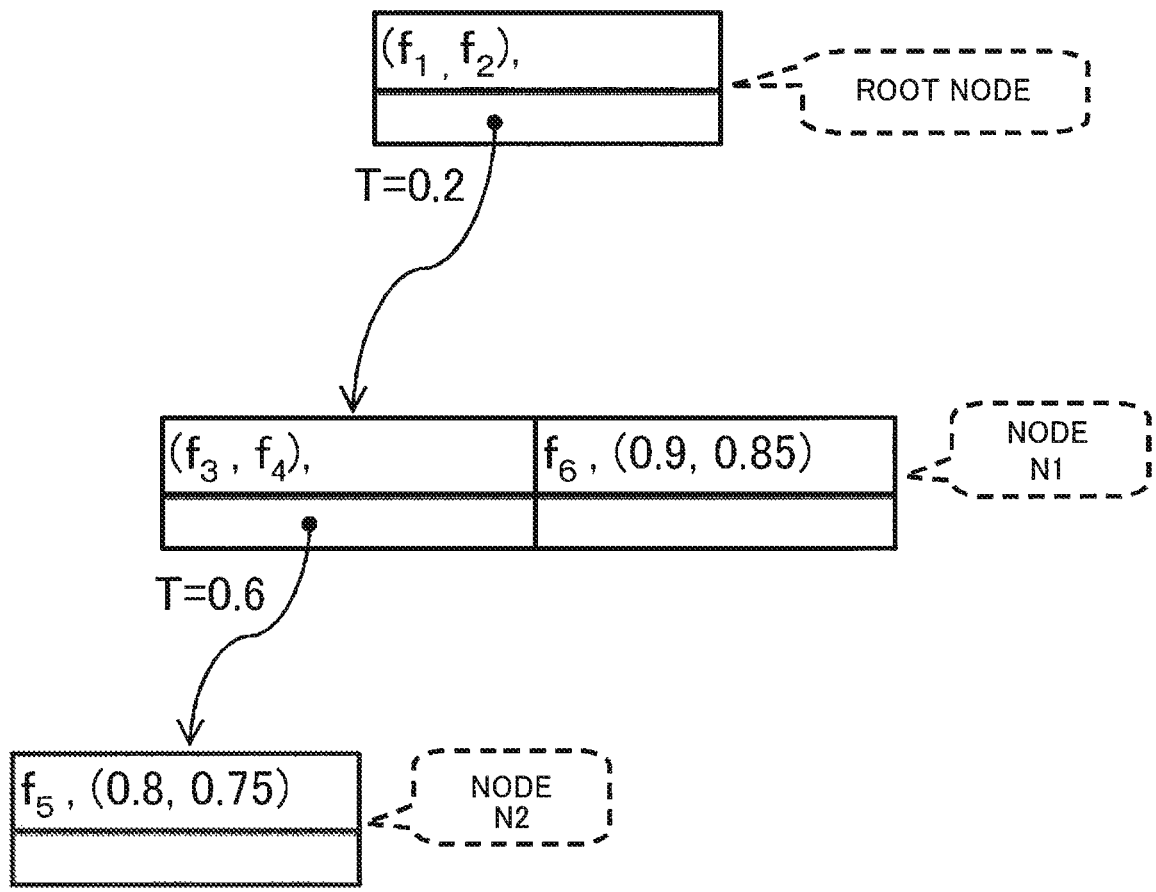
FIG. 20 is a diagram conceptually illustrating an index generation process in Example 2.

FIG. 19 and FIG. 20 are diagrams conceptually illustrating index generation processes in Example 2. As illustrated in FIG. 19, a root node that has an entry in which a pointer to a child node, a similarity degree threshold value (0.2), and data f1 and f2 have been set has already been generated, and in a node N1, three entries that include data f3, f4 and f5 have been set.

The search device 1, in this situation, acquires a datum f6 (S50). The similarity degrees (0.9) and (0.85) of the individual ones of the data f1 and f2 with the datum f6 are each greater than a similarity degree threshold value (0.2). Thus, the search device 1 sets as an object node the node N1, which is a child node of the root node (S53).

Since the node N1 is a leaf node (NO in S54), the search device 1 adds an entry that includes the datum f6 into the object node N1 (S55). Since the number of entries (4) in the object node N1 exceeds a predetermined entry threshold value (3) (YES in S56), the search device 1 performs an overflow adjustment.

In this overflow adjustment, as illustrated in FIG. 19, the search device 1 selects two data from all the data of all the entries included in the object node N1 as representatives (S57). Since the first selection method described above is used in this example, the search device 1 selects two data between which the value of similarity degree is the greatest as representatives. In the example in FIG. 19, the datum f3 and the datum f4 are selected as representatives. Moreover, the search device 1 sets a new similarity degree threshold value (0.6) (S58).

The search device 1 individually computes the similarity degrees between the individual ones of the data f3 and f4 selected as representatives with the data f5 and f6 of the other entries (S59). In this example, similarity degrees as indicated in the example in FIG. 20 are individually computed. Due to this, as illustrated in FIG. 20, the search device 1 generates a child node N2 that includes one entry that has the data f5, which exhibits a similarity degree greater than or equal to the similarity degree threshold value (0.6) with respect to each of the data f3 and f4 (S60). In the example in FIG. 20, the similarity degree (0.6) between the datum f6 and the datum f4 is greater than or equal to the similarity degree threshold value (0.6). However, since the similarity degree (0.5) between the datum f6 and the datum f3 is less than the similarity degree threshold value (0.6), the datum f6 is left in the node N1.

The search device 1 generates one entry that includes the data f3 and f4 in the object node N1, and sets in that entry a pointer to a child node N2 and a similarity degree threshold value (0.6) (S61). Due to this, the updated similarity degree tree is as illustrated in FIG. 20.

[Modifications]

Although in the exemplary embodiments and the examples described above, an entry that indicates a feature amount datum that becomes a representative is included only in a parent node, such an entry may be included in both a parent node and a child node.

Furthermore, although in the foregoing exemplary embodiments, the search device 1 is realized as one device (computer), the search device 1 may also be realized as a plurality of devices. For example, each exemplary embodiment described above may also be constructed of an index generating device that generates a similarity degree tree and a search device that performs a similarity search. In that case, the index generating device includes the object acquisition unit 20, the index generating unit 21, the threshold setting unit 22, and the similarity computation unit 25, and the search device includes the search unit 30 and the database 35. Furthermore, each exemplary embodiment may be constructed of an index generating device, a search device, and a database device.

Further, although in the plurality of flowcharts used in the foregoing description, a plurality of steps (processing) is mentioned in order, the execution order of steps executed in each exemplary embodiment is not restricted to the order mentioned above. In each exemplary embodiment, the order of steps indicated in the drawings can be changed within such a range that there is no impediment in terms of content. Furthermore, the exemplary embodiments and the modifications described above can be combined within such a range that there is no contradiction in content.

This application claims the benefit of the priority based on Japanese Patent Application No. 2013-003970 filed on Jan. 11, 2013, the disclosure of which is incorporated herein in its entirety by reference.

The invention claimed is:

1. An index generating device configured to generate an index in which a plurality of nodes each of which includes at least one entry that indicates a datum to be indexed are hierarchized, the index generating device comprising:
a memory storing instructions; and
at least one processor configured to process the instructions to implement:
an index generating unit configured to, using a degree of approximation between data computed by a similarity computation unit, generate the index that includes a lower order node and a higher order node, the higher node including an entry, the entry having a link relation with the lower order node and indicating a representative datum, a degree of approximation between the representative datum and a datum being indicated by an entry in the lower order node, and the degree of approximation between the representative datum and the datum indicated by the entry in the lower order node being greater than or equal to a degree of approximation threshold value appended to the link relation; and a threshold setting unit configured to set the degree of approximation threshold value to a value that increases with descent in hierarchy, wherein the threshold setting unit is further configured to set, based on a determination that a number of entries of the higher order node exceeds a predetermined entry threshold value, as a new degree of approximation threshold value, one of:

a value obtained by recursive division between the greatest degree of approximation and an already set degree of approximation threshold value, or a value obtained from the degree of approximation of the representative datum with respect to another entry included in the higher order node.

2. The index generating device according to claim 1, wherein the at least one processor is further configured to process the instructions to implement an object acquisition unit configured to acquire an index object datum, wherein the index generating unit is further configured to:

acquire the degree of approximation between the representative datum indicated by the entry in the higher order node and the index object datum acquired by the object acquisition unit from the similarity computation unit, compare the degree of approximation acquired and the degree of approximation threshold value, and, based on a result of comparison, set an insertion destination of an entry that indicates the index object datum to the higher order node or the lower order node.

3. The index generating device according to claim 1, wherein the at least one processor is further configured to process the instructions to implement:

a representative selection unit configured to select a representative entry from a plurality of entries included in the higher order node; and an overflow adjustment unit configured to, when the number of entries in the higher order node exceeds the predetermined entry threshold value:

select an entry from the plurality of entries included in the higher order node that indicates a datum having a degree of approximation with a datum indicated by the representative entry selected by the representative selection unit greater than or equal to the new degree of approximation threshold value set by the threshold setting unit, generate a lower order node that includes the entry selected, set a link relation with the lower order node in the representative entry in the higher order node, and append the new degree of approximation threshold value to the link relation.

4. The index generating device according to claim 3, wherein the representative selection unit is further configured to select an entry that indicates a datum that has the smallest variance of the degrees of approximation with data indicated by other entries or an entry that indicates a datum that has the greatest number of data indicated by other entries to which the entry is the nearest neighbor as the representative entry.

5. The index generating device according to claim 3, wherein the representative selection unit is further configured to select a plurality of representative data from a plurality of data indicated by a plurality of entries included in the higher order node, and wherein the overflow adjustment unit is further configured to, when the number of entries in the higher order node exceeds the predetermined entry threshold values:

select, from a plurality of data indicated by a plurality of entries included in the higher order node, a datum having at least one of a plurality of degrees of approximation with a plurality of representative data selected by the representative selection unit greater than or equal to the new degree of approximation threshold value set by the threshold setting unit, and generate a lower order node that includes an entry that indicates the datum selected, and wherein the representative selection unit is further configured to:

generate in the higher order node an entry that indicates the plurality of representative data, set in the entry a link relation with the lower order node, and append the new degree of approximation threshold value to the link relation.

6. The index generating device according to claim 5, wherein the representative selection unit is further configured to select from the plurality of data indicated by the plurality of entries included in the higher order node a combination of data between which a value of the degree of approximation is the greatest or the smallest as the plurality of representative data.

7. An index generating method that generates an index in which a plurality of nodes each of which includes at least one entry that indicates a datum to be indexed are hierarchized, the index generating method comprising:

generating the index that includes a lower order node and a higher order node, the higher node including an entry, the entry having a link relation with the lower order node and indicating a representative datum, a degree of approximation between the representative datum and a datum being indicated by an entry in the lower order node, and the degree of approximation between the representative datum and the datum indicated by the entry in the lower order node being greater than or equal to a degree of approximation threshold value appended to the link relation; and setting the degree of approximation threshold value to a value that increases with descent in hierarchy, wherein the setting of the degree of approximation threshold value comprises setting, based on a number of entries of the higher order node exceeding a predetermined entry threshold value, as a new degree of approximation threshold value, one of:

a value obtained by recursive division between the greatest degree of approximation and an already set degree of approximation threshold value, or a value obtained from the degree of approximation of the representative datum with respect to another entry included in the higher order node.

8. The index generating method according to claim 7, further comprising:
- acquiring an index object data;
- acquiring the degree of approximation between the representative data indicated by an entry in the higher order node and the index object datum acquired;
- comparing the degree of approximation acquired and the degree of approximation threshold value; and
- setting, based on a result of comparison, an insertion destination of the entry that indicates the index object datum to the higher order node or the lower order node.

9. The index generating method according to claim 7, further comprising:
- selecting a representative entry from a plurality of entries included in the higher order node, when the number of entries in the higher order node exceeds the predetermined entry threshold value;
- selecting an entry that indicates a datum having a degree of approximation with a datum indicated by the representative entry selected greater than or equal to the new degree of approximation threshold value;
- generating a lower order node that includes the entry selected;
- setting a link relation with the lower order node in the representative entry in the higher order node; and
- appending the new degree of approximation threshold value to the link relation.

10. The index generating method according to claim 9, wherein
- the selecting of the representative entry comprises selecting an entry that indicates a datum that has the smallest variance of the degrees of approximation with data indicated by other entries or an entry that indicates a datum that has the greatest number of data indicated by other entries to which the entry is the nearest neighbor as the representative entry.

11. The index generating method according to claim 9, wherein
- selection of the representative entry selects a plurality of representative data from a plurality of data indicated by a plurality of entries included in the higher order node, when the number of entries in the higher order node exceeds the predetermined entry threshold value;
- selection of the entry selects a datum having at least one of a plurality of degrees of approximation with the plurality of representative data selected greater than or equal to a newly set degree of approximation threshold value;
- generation of the lower order node generates a lower order node that includes an entry that indicates the datum selected; and
- setting of the link relation generates an entry that indicates the plurality of data in the higher order node, and sets in the entry a link relation with the lower order node.

12. The index generating method according to claim 11, wherein selection of the representative entry selects from the plurality of data indicated by the plurality of entries included in the higher order node a combination of data between which a value of the degree of approximation is the greatest or the smallest as the plurality of representative data.

13. A non-transitory computer-readable storage medium storing a program that causes at least one computer to execute the index generating method according to claim 7.

14. A non-transitory memory storing a data structure of an index in which a plurality of nodes each of which includes at least one entry that indicates a datum to be indexed are hierarchized,
- wherein the index comprises:
  - a lower order node; and
  - a higher order node that includes an entry, the entry having a link relation with the lower order node and indicating a representative datum, a degree of approximation between the representative datum and a datum being indicated by an entry in the lower order node, and the degree of approximation between the representative datum and the datum being indicated by the entry in the lower order node being greater than or equal to a degree of approximation threshold value appended to the link relation, and
- wherein a computer refers to the index in order to compute a degree of approximation between the representative data indicated by the entry in the higher order node and a search object datum, compare the degree of approximation and the degree of approximation threshold value appended to the link relation that the entry in the higher order node has, and, based on a result of comparison, obtain a search result that corresponds to the search object datum,
- wherein the computing of the degree of approximation threshold value comprises setting, based on a number of entries of the higher order node exceeding a predetermined entry threshold value, as a new degree of approximation threshold value, one of:
  - a value obtained by recursive division between the greatest degree of approximation and an already set degree of approximation threshold value, or
  - a value obtained from the degree of approximation of the representative datum with respect to another entry included in the higher order node.

* * * * *